United States Patent
Mercer et al.

(10) Patent No.: US 6,423,394 B1
(45) Date of Patent: *Jul. 23, 2002

(54) PLASTICS MATERIAL MESH STRUCTURES

(75) Inventors: Frank Brian Mercer, Blackburn; Keith Fraser Martin, Clitheroe; Stuart Green, Preston; Nigel Edwin Wrigley, Blackburn, all of (GB)

(73) Assignee: Netlon Limited, Blackburn (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/836,722

(22) PCT Filed: Nov. 24, 1995

(86) PCT No.: PCT/GB95/02753
§ 371 (c)(1),
(2), (4) Date: Jul. 28, 1997

(87) PCT Pub. No.: WO96/15901
PCT Pub. Date: May 30, 1996

(30) Foreign Application Priority Data

Nov. 24, 1994 (GB) .............................. 94 23721

(51) Int. Cl.$^7$ .......................... B32M 3/24; B29C 55/12; E02D 17/20

(52) U.S. Cl. ....................... 428/131; 428/105; 428/134; 428/135; 428/136; 428/910; 264/288.8; 264/290.2; 264/DIG. 47; 264/DIG. 81; 405/258.1; 405/16; 405/262; 405/284

(58) Field of Search ................................. 428/105, 131, 428/134, 135, 136, 910; 264/288.8, 290.2, DIG. 47, DIG. 81; 405/258.1, 16, 262, 284

(56) References Cited

U.S. PATENT DOCUMENTS

| | | | |
|---|---|---|---|
| 3,252,181 A | 5/1966 | Hureau | 18/12 |
| 3,386,876 A | 6/1968 | Wyckoff | 161/109 |
| 3,746,607 A | 7/1973 | Harmon et al. | 161/109 |
| 3,851,034 A | 11/1974 | Harmon et al. | 264/147 |

(List continued on next page.)

FOREIGN PATENT DOCUMENTS

| | | |
|---|---|---|
| EP | 0076689 A3 | 4/1983 |
| EP | 0076689 A2 | 4/1983 |
| EP | 0108513 A1 | 5/1984 |
| EP | 0198704 A3 | 10/1986 |
| EP | 0198704 A2 | 10/1986 |
| EP | 0374365 A2 | 6/1990 |

(List continued on next page.)

Primary Examiner—William P. Watkins, III
(74) Attorney, Agent, or Firm—Jacobson Holman, PLLC

(57) ABSTRACT

In order to provide wider biaxially-stretched geogrids having high primary direction (PD) strength, crotch-forming zones of a starting material which is at least 2.0 mm thick have protuberances (6). On strectching, PD orientation passes right through the junction (27) but the protuberance (6) causes the orientation ratio of the crotch edge to decrease significantly as orientation enters the central part of the crotch edge. After a secondary direction stretch of at least about 1.5:1, the thickness of the central part of the crotch edge is not reduced by more than about 20%. The stretching does not reduce the thickness of any point along notional ridge lines (31) to such an extent that the ratio of finished thickness to starting thickness at that point mid-point. In the biax geogrid (25), the junction mid-point is significantly thicker than the PD is less than about 80% of the ratio of finished thickness to starting thickness of the junction strand mid-point. The thickest part of the crotch is greater than about 80% of the thickness of the mid-point of the junction (27). The junction (27) has a generally square or rectangular central zone with narrow projections (28) at the corners extending outwards to the crotch edges.

25 Claims, 18 Drawing Sheets

U.S. PATENT DOCUMENTS

| | | | |
|---|---|---|---|
| 4,140,826 A | 2/1979 | Liu | 428/113 |
| 4,374,798 A | 2/1983 | Mercer | 264/288.8 |
| 4,536,429 A | 8/1985 | Mercer | 428/136 |
| 4,574,100 A | 3/1986 | Mercer | 428/134 |
| 4,590,029 A | 5/1986 | Mercer | 264/156 |
| 4,618,385 A | 10/1986 | Mercer | 156/229 |
| 4,680,215 A | 7/1987 | Mercer | 428/107 |
| 4,743,486 A | 5/1988 | Mercer et al. | 428/134 |
| 4,756,946 A | 7/1988 | Mercer | 428/136 |
| 5,053,264 A | 10/1991 | Beretta | 428/131 |
| 5,156,495 A | 10/1992 | Mercer | 405/262 |
| 5,267,816 A | 12/1993 | Mercer et al. | 405/258 |
| 5,269,631 A | 12/1993 | Mercer et al. | 405/258 |
| 5,419,659 A | 5/1995 | Mercer | 405/258 |

FOREIGN PATENT DOCUMENTS

| | | |
|---|---|---|
| EP | 0418104 A2 | 3/1991 |
| EP | 0418104 A3 | 3/1991 |
| EP | 0515233 A3 | 11/1992 |
| EP | 0515233 A2 | 11/1992 |
| FR | 2131842 | 11/1972 |
| GB | 982036 | 2/1965 |
| GB | 2256164 A | 2/1992 |

FIG. 7b
FIG. 7a
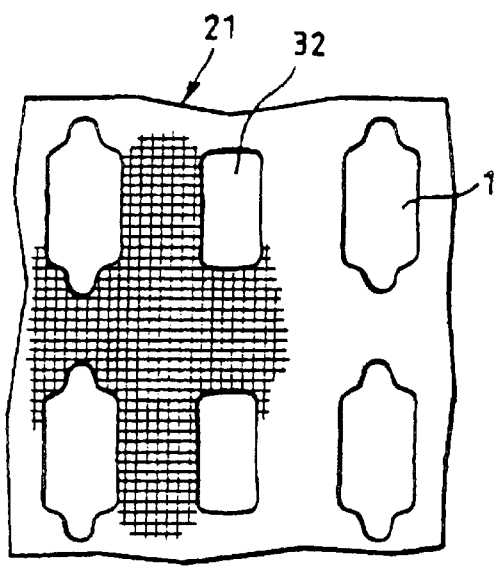
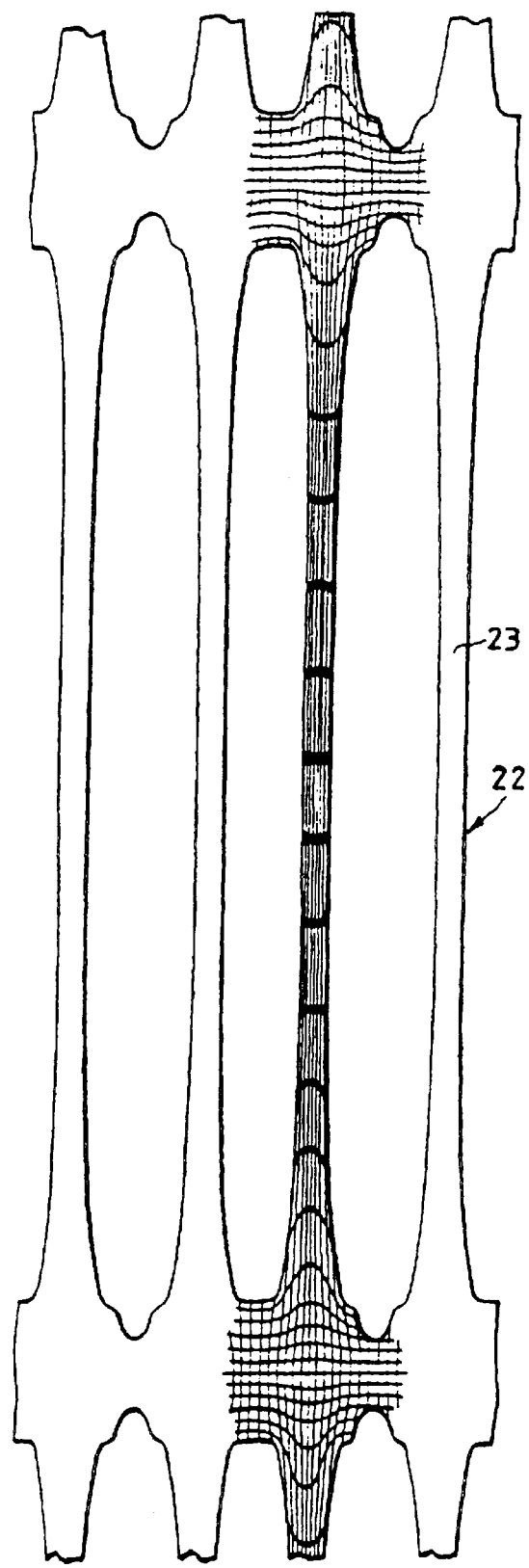

FIG. 8a
FIG. 8b
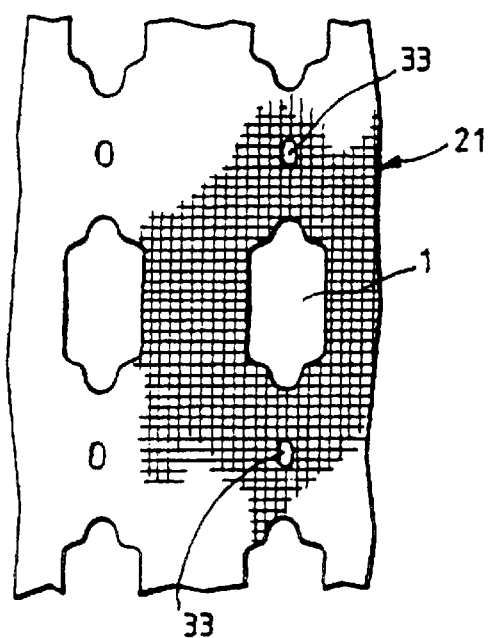
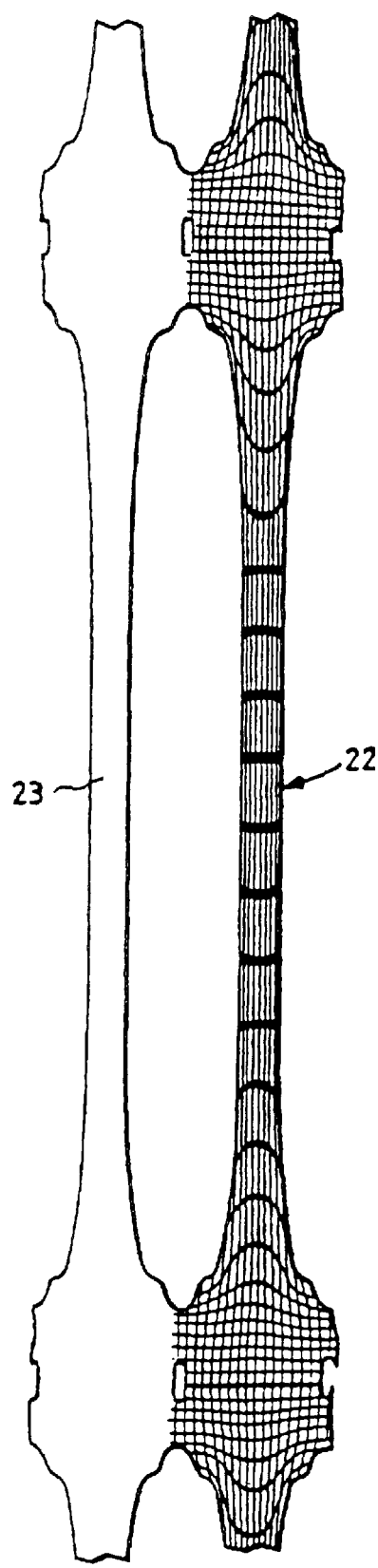

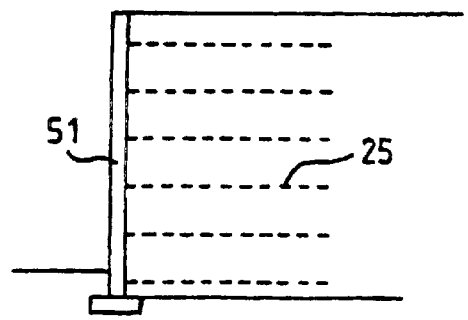
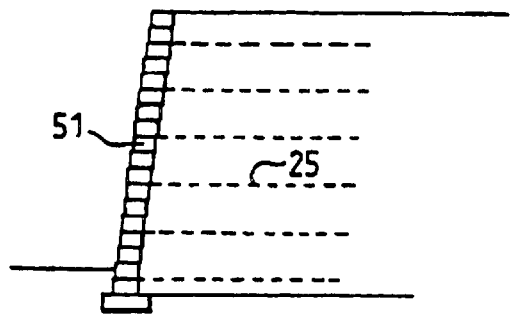
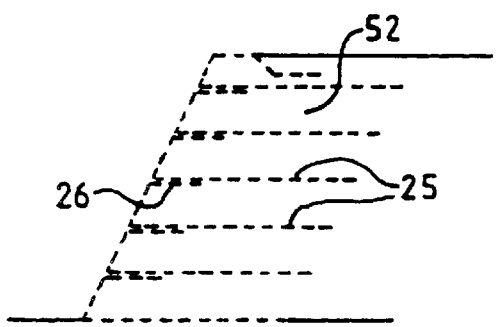
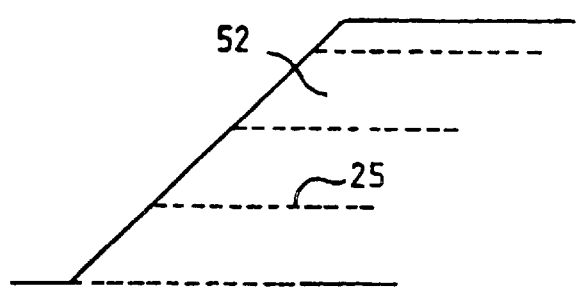
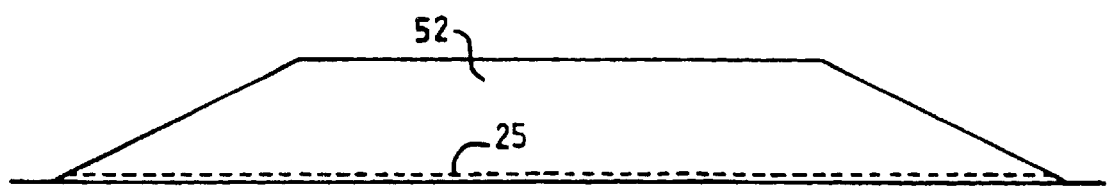

PLASTICS MATERIAL MESH STRUCTURES

BACKGROUND OF THE INVENTION

The present invention relates to a method of producing a biaxially-stretched plastics material mesh structure, suitable for geotechnical and other civil engineering uses; a mesh structure employed for such uses can be referred to as a geogrid. The mesh structure is unbalanced, ie has a greater strength in a primary direction (PD) than in a secondary direction (SD) substantially at right angles to the PD. The method comprises providing a starting material which has a thickness (defined below) of at least about 2 mm and has a pattern of holes on a notional substantially square or rectangular grid whose axes are substantially parallel to the PD and to the SD respectively, the sides of PD end portions of at least some of said holes being defined by crotch-forming zones. The starting material is of square construction; ie the PD and the SD are aligned with the two orthogonal axes of the eventual product. PD stretch is applied to form oriented PD strands and to apply some orientation to the notional junction zones (defined below) so that orientation extends into and through the notional junction zones, from the end of one oriented PD strand to the adjacent end of the aligned oriented PD strand. SD stretch is applied to form oriented SD strands. At least part of the length of the edges of crotches connecting adjacent sides of adjacent PD and SD strands is oriented in the direction running round the crotch. The mid-point of the notional junction zone (defined below) in the mesh structure is significantly thicker than the mid-point of any oriented strand entering the notional junction zone.

The present invention also relates to a biaxially-molecularly-oriented integral plastics material mesh structure made from a starting material which has a thickness of at least about 2 mm and comprising oriented PD strands and oriented SD strands, interconnected by junctions with respective sides of adjacent oriented PD and oriented SD strands interconnected by crotches at least part of whose length is oriented with orientation running in the direction around the crotch. The orientation of the PD strands extends into and through the junctions. The junction mid-point thickness is significantly greater than the mid-point thickness of any oriented strand entering the junction.

The mesh structures of the invention were designed for applications in which the main tensile force will be applied in the PD, and the mesh structures have significantly greater strength in the PD than in the SD; for instance, when the mesh structure is attached to a vertical wall facing in a retained wall geoengineering construction, the main tensile force will be at right angles to the facing and can be aligned with the PD of the mesh structure.

U.S. Pat. Nos. 4,374,798 and 5,053,264 disclose mesh structures of the general type with which the present invention is concerned. U.S. Pat. Nos. 5,267,816 and 5,269,631 disclose mesh structures which have greater strength in the PD than in the SD.

From the point of view of PD strength and failure mode, the best structure is found to be a uniaxially-oriented (uniax) structure, as for example strengths of up to at least 160 kN/m width can be achieved with a 5.5:1 PD stretch ratio. However, in order to reduce the time taken to build a geotechnical construction whilst maintaining the strength of the construction, it is desirable to increase the width of the geogrid without reducing the PD strength per strand or the economy rating in the PD more than about 5% or 10%. As there is a limitation on the width of starting materials, this can only be achieved in manufacture by stretching in the transverse direction (TD). Thus although the improvements of U.S. Pat. Nos. 5,267,816 and 5,269,631 are primarily directed towards significantly increasing the machine direction (MD) strength by enabling one to apply greater PD stretches, the present invention is more concerned with being able to apply SD stretches without greatly reducing the PD strength per strand or the economy rating, whilst providing a satisfactory creep strain behaviour with adequate long term strength. Nevertheless, it is very difficult to produce biax products whose PD strength per strand or economy rating is similar to the PD strength per strand or economy rating of the intermediate uniax material if reasonable stretches are applied in the SD. This is because the SD stretch affects the PD strength of the junction. Also the SD strands must be sufficiently robust eg to reinforce soil.

It is desirable to have a low SD punch-out in order to leave as much material as possible in the PD strand-forming zones and produce a high strength product using not too thick a starting material. However, if the SD punch-out is decreased, the PD orientation through the junction becomes more difficult to control.

It is desirable that any alteration in the manufacturing technique should produce a mesh structure which appears robust to the eye (as this is important for sales), and that the mesh structure should have an acceptable failure mode. As a general principle, it is desirable to have failure in the PD strand and not in the junction as this enables better prediction of the long term performance of the product.

THE INVENTION

According to the method of the invention, crotch-forming zones in the starting material have protuberances. Each protuberance may be in the plan view shape of the hole, namely a portion of the crotch-forming zone which projects into the respective hole beyond a base line which is tangent to each end of the projecting portion. Alternatively or in addition, the protuberance may be out of the plane of the starting material, being a thickening when approached from the edge of the PD strand-forming zone and/or when approached from the edge of the SD strand-forming zone. In the special case where there is no thickening when approaching from the edge of the PD strand-forming zone (defined below) and also no protuberance as seen in the plan view shape of the hole, there is a tendency for the orientation to proceed too far around the crotch in the PD stretch. This tendency is avoided by ceasing PD stetching before the orienation has reached the thickening (which considered as one progresses from the PD strand-forming zone will be a decrease in thickness).

The size of said protuberance is such that during the stretch, at least part of the edge of the crotch interconnecting adjacent sides of adjacent oriented PD and oriented SD strands is oriented in the direction running around the crotch, but the orientation ratio decreases significantly as one passes around the crotch edge, either from the oriented PD strand or from the oriented SD strand. In the biax product, the crotch edge either a) has an unoriented part, or b) the thickness of the least oriented part of the crotch edge is reduced (or the length of the least oriented part of the crotch edge is increased) by no more than about 20% (or than about 15%, 10% or 5%, as alternatives) of its thickness (or length) prior to stretching. The action of stretching does not reduce the thickness of any point along notional ridge lines of maximum thickness on the product from the junction mid-point to the crotch edges to such an extent that the ratio of finished thickness to starting thickness at that point is less than about 80% (or than about 85%, 90%, 95%, as alternatives) of the ratio of finished thickness to starting thickness of the notional junction zone mid-point.

In the biaxially-stretched mesh structure of the invention, the junctions comprise a central zone which is thicker than thinner zones adjacent the ends of oriented PD and oriented SD strands. If the junction interconnects two oriented PD strands entering a junction from opposite sides and two oriented SD strands entering the junction from two other opposite sides, the junction central zone will be generally square or rectangular; the central zone need only be generally square or rectangular and its sides could be concave or convex. The central zone has a narrow projection at the corner extending outwards between said thinner zones, continuing through the crotch between the oriented PD strand and the oriented SD strand, and running into the crotch edge. Though the central zone is thicker than said thinner zones, the narrow projection may be thicker than the central zone. There is no point on a notional line of maximum thickness on the product from the junction mid-point to the crotch edge having a thickness of less than about 80% (or than about 85%, 90% or 95%, as alternatives) of the thickness of the junction. mid-point. The central part of the crotch edge zone can be convex. The mesh material defined above is the product produced from a starting material with flat or nearly flat faces; if a starting material face or faces diverge markedly from flatness, the product will be altered correspondingly.

The invention extends to a method of strengthening soil, comprising embedding in the soil the mesh structure of the invention or the mesh structure produced by the method of the inventio n, and to a geotechnical construction (a composite civil engineering construction) comprising a mass of soil strengthened by embedding therein the mesh structure of the invention or the mesh structure produced by the method of the invention.

DEFINTIONS

The understanding of several of the following definitions is assisted by references in FIG. 1a of the accompanying drawings, but the definitions are not limited to the shape of hole 1 shown in FIG. 1a.

The term "oriented" means molecularly-oriented. In general, when an oriented strand is referred to, the preferred direction of orientation is longitudinal of the strand.

"Uniax" and "biax" mean uniaxially-oriented and biaxially-oriented, respectively. Substantially uniaxially-oriented means that on the surface of the structure, there has been extension of the mgterial in one direction but no substantial resultant extension of the material in the direction at right angles.

In relation to a mesh structure, "biaxially-oriented" means that the mesh structure has been stretched in two directions generally at right angles to each other.

The "orientation ratio" is the stretch ratio in a localised area.

The holes in the starting material may be through-holes or blind holes. If the holes are blind, the film or membrane in the hole will either rupture on stretching, or may remain as a thin membrane.

A "tangent line" is a notional line tangent to the ends of the holes on either side of a strand-forming zone, whether or not the hole is in accordance with the invention. FIG. 1a shows "SD tangent lines" 2 tangent to the PD ends of the holes 1 and "PD tangent lines" 3 tangent to the SD sides of the holes 1.

In extruded starting materials and in embossed or moulded starting materials, the holes are not normally vertical sided (ie perpendicular to the plane of the starting material). For extruded starting materials as a good approximation, the tangent line can be taken as the notional line tangent to the plan view see-through, ie the minimum hole size as viewed normal to the plane of the material, but ignoring film or feathered edges. For embossed or moulded starting materials, where the holes normally have sloping sides, as a good approximation, the tangent line can be taken as the notional line tangent to a point half way up the side of the hole, or, if the slope is different on each face, tangent to a point half-way between points half-way up the respective slopes, films or membranes in blind holes being ignored.

The "notional junction zone" 4 is the zone of the starting material defined between the respective pairs of SD and PD tangent lines 2, 3. In the mesh structures, the notional junction zones are the zones of the surfaces of the structure which have been formed from the notional junction zones of the starting material.

When the plastics starting material is biaxially stretched in two directions substantially at right angles, the PD and SD, oriented PD strands and oriented SD strands are formed, extending in directions substantially at right angles to each other. The PD and SD strands are connected at junctions. At the junctions, the edge zone of each PD strand is connected to the edge zone of the respective SD strand by a continuous zone of plastics material which is located at the edge of the junction in the product and is formed from plastics material at the corner of the junction-forming zone in the starting material. This continuous zone of plastics material is termed the "crotch" herein. The "direction running around the crotch" as used herein and in the appended clause is the curved direction extending between adjacent oriented strands, either from the SD strand to the adjacent TD strand, or vice-versa.

A "crotch-forming zone" 13 is the zone adjacent the corner of the respective notional junction zone 4, lying between a respective hole 1, the adjacent PD tangent line 3 and the adjacent SD tangent line 2.

A "PD strand-forming zone" 11 is the zone between respective holes 1 and at its ends between respective crotch-forming zones 13, which extends from the SD tangent line 2 tangent to the first PD ends of the respective holes 1 to the SD tangent line 2 tangent to the other, second PD ends of the holes 1.

An "SD strand-forming zone" 9 is the zone between respective holes 1 and between respective crotch-forming zones 13, which zone extends from the PD tangent line 3 tangent to the first SD ends of the respective holes 1 to the PD tangent line 3 tangent to the other, second ends of the holes 1. It is not necessary that orientation will pass along the whole of the SD strand-forming zone, and normally the very ends will not be stretched out.

A notional line of maximum thickness is a notional line taken from a point of maximum thickness on one edge of the structure to a point of maximum thickness on another edge of the structure and joining together points of maximum thickness in between.

"Strictly uniplanar" means that the material or structure is symmetrical about a median plane parallel to its faces. In general, a uniplanar starting material will give a uniplanar struture when stretched.

"Substantially uniplanar" means that the material or structure does not deviate so much from strict uniplanarity that orientation is not comparable on each face of the biax product.

A "strictly flat" starting material has monoplanar, parallel faces.

The "starting material" is the material immediately before initiation of the first stretch. However, when considering whether there is a thickening, the material should be as it would be without the application of the cold grooving technique described in U.S. Pat. No. 4,590,029, if such a technique has been applied, as the technique has little effect on the final orientation behaviour.

The "pitch" of holes is the distance apart of the centres of the holes in a specified direction.

"Punch-out" is the ratio of the maximum dimension of the holes (ie between the respective tangent lines) in a specified direction to the pitch of the holes in the same direction, whether or not the holes have been formed by punching or by another procedure which may not even involve material removal.

The terms "thick" and "thin" refer to the dimension normal to the plane of the material or mesh structure. Unless otherwise specified, the thickness is tne distance between the extreme faces at the thickest point. However, raised edges or tapered or feathered edges are ignored, as well as any minor grooves in the surface and any irrelevant projections from the surface.

The dimension "t" is the mean thickness of the starting material where the dimension a is measured, ie at the minimum SD dimension (width) or narrowest part of the PD strand-forming zone 11, the part that often determines the strength of the product. t is taken as the "thickness of the starting material", whether or not other parts of the starting material are thicker.

Where a crotch edge is referred to, eg for measuring the thickness of the crotch edge, a point is taken as close to the crotch edge (as seen in plan view) as possible, whether or not the edge is raised or somewhat tapered, though ignoring any feathering or membranous material that does not form part of the crotch proper, ignoring abrupt tapering required for mould withdrawal in moulded starting materials, and ignoring any radiussing caused by punching holes, though the reduction in thickness leading up to the radiussing is not ignored; it has been found that the crotch edge zone can be reduced in thickness by 9% to 10% as a result of punching alone.

The "width" is the dimension at right angles to the major axis of the zone in question, and "narrow" relates to this dimension. "Narrow" means significantly longer than wide.

The stretch ratios are as measured after releasing the stretching force or after annealing if annealing is carried out, and as measured on the surface of the structure.

The "overall stretch ratio" is the stretch ratio applied to the whole length of the material.

"HDPE" is high density polyethylene.

The "strength" of a mesh structure as used herein is the maximum strength per linear unit, measured in a normal tensile test, the linear units being in the direction at right angles to the direction in which the strength is measured, whether the strength is measured in the PD or in the-SD.

The "rib strength" is the maximum strength per strand.

The "economy rating" is the PD strength of the product per unit width per mass per unit area, measured as kN per m per kg per m in the PD.

"Truth lines" are parallel lines applied (normally by printing or drawing) to the starting material, normally in two directions parallel to the PD and SD respectively.

The "shoulder tangent" 5 is the tangent to a side of the projecting portion or protuberance 6 at the point where the tangent makes the greatest angle with the PD, said angle being measured so that it is less than 90°0 if the shoulder tangent 5 is directed towards the PD centre-line 7 of the hole 1 and towards the centre-line 8 of the adjacent SD strand-forming zone 9 and so that it is more than 90° if the shoulder tangent 5 is directed towards the PD centre-line 7 of the hole 1 and away from the centre-line 8 of the adjacent SD strand-forming zone 9.

The "shoulder angle" is the angle $\theta$ which the shoulder tangent 5 makes with the PD.

The "neck tangent" 10 is the tangent to a side of the protuberance 6 at the point where the tangent makes the smallest angle (positive or negative) with the PD, said angle being measured so that it is positive if the neck tangent 10 is directed towards the centre-line 8 of the adjacent SD strand-forming zone 9 and towards the PD centre-line 7 of the hole 1 and so that it is negative if the neck tangent 10 is directed towards the centre-line 8 of the adjacent SD strand-forming zone 9 but generally away from the PD centre-line 7 of the hole 1.

The "neck angle" is the angle $\psi$ which the neck tangent 10 makes with the PD.

The dimension "a" is the minimum SD distance between adjacent side-by-side holes 1.

The dimension "b" is the SD dimension between adjacent side-by-side holes 1, between the points where the respective neck tangents 10 are tangent to the sides of the protuberances 6 (measured at the point where the neck tangent 10 is coincident with the crotch edge and furthest from the PD end of the hole 1, if the respective part of the protuberance side is straight).

The dimension "c" corresponds to the dimension a, but is taken in the PD.

The dimension "d" corresponds to the dimension b, but is taken in the PD, between the points where the respective shoulder tangents 5 are tangent to the sides of the protuberances 6 (measured at the point where the shoulder tangent 5 is coincident with the crotch edge and furthest from the SD side of the hole 1, if the respective part of the protuberance side is straight).

The "junction diagonal ratio" is the ratio of the diagonal dimension in the biax product across two diagonally opposed points of minimum or zero orientation of crotches and across a junction, to the same diagonal dimension i in the starting material.

The "base line" 12 of the protuberance 6 is the line tangent to each end of the protuberance 6.

The "projecting extent" j of the protuberance 6 is the greatest extent of the protuberance 6 as measured at right angles to the base line 12.

The term "soil" includes rocks, stones, gravel, sand, earth, clay, aggregate held by a binder such as asphalt, or any other particulate or cohesive material used in geotechnical engineering.

ABOUT THE INVENTION

Using the invention, it has been found that the protuberance has made it possible to direct orientation positively through the junction, generally along the PD, while limiting the actual degree of orienation across the centre of the junction. The invention controls and limits the level of orientation in the crotches whilst nonetheless maintaining crotch edges which are oriented for at least part of their length in the direction running around the crotch. Although the crotches can be continuously oriented in the direction running around the crotch (ie "uniaxial" orientation), there are no crotches which are highly oriented from end to end.

Apart from the unoriented or low-oriented part of the crotch edge, there is a range of orientation ratio in the crotch edge extending continuously from the ratio in the unoriented or low-oriented part up to the orientation ratio of the respective oriented strand, or to a value even greater than that in the oriented strand. When PD stretch is applied, the protuberance provides a rapid increase in the cross-sectional area of the crotch-forming zone as the orientation progresses from the yield point(s) in a PD strand-forming zone towards the junction; the rapid increase is preferably followed by a region of more slowly increasing cross-sectional area. In other words the invention puts a block in the centre part of the crotch-forming zone, thereby preventing in a controllable manner high orientation passing all the way around the crotch edge. The invention also controls and limits any orientation passing behind the block, both in the PD stretch and in the SD stretch. The block is characterised in the product by a sharp increase in thickness (called a neck) in the crotch as one goes around the crotch from the side of the respective PD strand. For instance, one can obtain a very low crotch edge thickness reduction, of less than about 20% or even of less than about 5%, at the crotch-edge centre portion. As there will often be a sharp increase in thickness on either side of the unoriented or least oriented part of the crotch edge as this part is approached, the crotch edge thickness should be measured at its thickest point, or its extension should be measured at its part of least extension; thus, if it is difficult to measure the reduction in thickness of a crotch edge, its extension (ie orientation ratio) can be measured, for instance by drawing parallel lines across the median plane on the side face of the starting material (which parallel lines are as close together as practicable), and measuring their separation on the starting material and on the product (after biaxial stretching). The region having the increase in thickness can have a slope of about 45° to the plane of the mesh structure, ie an included angle of about 90°.

The effect of the invention occurs even if the PD strand-forming zones form a large part of the SD width of the starting materal, and the invention can be used with low SD punch-out ratios; thus the SD punch-out can be less than about 60%, 55% or 50%, and preferably less than about 46%. This enables the economic manufacture of high PD strength products from relatively low thickness starting materials.

The invention eliminates or greatly reduces any tendency to splitting of transverse strands when the mesh structure is subject to PD forces. In other biax products, this can occur as a result of force transmission around highly oriented crotches to the adjacent SD strands; such splitting causes failure of the mesh structure in the junction zones and prevents the strength of the oriented PD strands being fully mobilised. In other words, in the structures of the invention, the junction stress pattern is more efficient when the structure is subjected to PD forces, and the structure can have a behaviour similar to that of a uniax structure. The PD and SD stretches do not interact or do not interact greatly, enabling the strength of a junction and hence the economy rating of a uniax structure to be maintained to a large extent in the final biax structure; thus it is preferred that during the SD stretch the mid-point of the junction does not reduce in thickness so that the orientation of the junction mid-point is uniaxial in the PD, though this is not essential. It is not necessary that all the SD strand-forming zone be stretched out on the SD stretch. The narrower very end portions of the hole (considered in the PD) can provide a narrow yield point for SD orientation and provide small bar widths (PD dimension) in a convenient manner; with suitable choice of PD pitches, the penetration of transverse orientation into the junction during the SD stretch is reduced whilst leaving enough material to form a satisfactory junction. There are no thin zones in the junctions such as could form tear starters and weaken the structure under the action of tensile forces.

An unexpected advantage of the invention is that the product can be very regular, even when produced using low (slow) strain-hardening materials, ie materials with a high natural draw ratio.

It has been found that a 4 m wide biax mesh structure which appears regular and robust to the eye can be formed from a starting material of about 1.5 m in width of a thickness not greater than 6.5 mm with a strength per meter width of 40 kN/m, having an acceptable failure mode and a satisfactory creep strain behaviour with adequate long term strength. Using the invention, it is possible to achieve resultant stretch ratios of up to 18:1 or more, for instance 5.5:1 in the PD and 3.3:1 in the SD. The PD stretch ratio (as measured from the mid-point of one notional junction zone to the mid-point of the adjacent junction zone in the PD) is preferably at least about 3:1 and more preferably at least 4.5:1 or 5:1. For higher strength products from a given starting material thickness, lower SD stretch ratios may be used, down to 1.5:1. The PD strength is significantly greater than the SD strength, eg at least about 1.5, 2, 2.5 or 3 times the SD strength. 6.5 mm sheet is sufficiently thin to be handled in production without particular difficulties though as machinery develops in the future it is anticipated that thicker materials, eg up to 15 mm, may be readily handled. In one example with about 8% crotch edge thickest part thickness reduction, the short term tensile behaviour of the biax product was found to be similar to that of the uniax intermediate product but the creep behaviour was found to be slightly worse than that of the uniax intermediate product.

As the orientation goes right through the junction in the PD stretch, the mid-point of the notional junction zone thins down, preferably by not more than about 10% and if possible by not more than about 5%. Due to pulling plastics material from other parts of the structure or due to relaxation of some of the orientation inserted during the PD stretching, the junction mid-point could increase in thickness during the SD stretch. Thus the final junction mid-point thickness is measured rather than the uniax thickness. The junction mid-point thickness will be significantly greater than the strand mid-point thicknesses, say at least twice the thickness, ie a difference in thickness which is not just due to random variation and which indicates that there is much greater orientation in the strand than across the junction. If desired, there can be continuous, substantially uniaxial orientation from end-to-end of the mesh structure, which provides reasonable long-term creep resistance, though this is not essential. In situations where long-term creep resistance is of less significance, one may use mesh structures of the present invention whose creep performance is inferior to that of a good custom-designed uniax mesh structure.

It is preferred that the junction diagonal ratio be close to unity, for example greater than about 0.8. If the ratio is unity, the diagonals of the junction have not altered in length during stretching, but usually the diagonals become shorter due to narrowing of the ends of the strand-forming zones and the junctions caused by stretching.

In general terms, the crotch-forming zone as seen in plan view as one progresses towards the PD end of the hole, can have:

i) a first part which widens out;

ii) a second part which does not widen out as rapidly as the first part;

iii) a third part which widens out more rapidly than the second part and terminates the crotch-forming zone.

Said first part is preferably immediately contiguous to the second part. Said second part is preferably immediately contiguous to said third part.

More specifically, the shape can be such that as one progresses towards the PD end of the hole:

iv) the side of said first part is progressively more inclined to the PD axis and is defined at least in part by a curve which is concave with respect to the hole;

v) the side of said second part is progressively less inclined to the PD (the angle of inclination can reduce to zero and then increase in the opposite sense) and is defined at least in part by a curve which is -convex with respect to the hole; and vi) the side of said third part is progressively more inclined to the PD and is defined at least in part by a curve which is concave with respect to the hole.

The b:a ratio is preferably greater than about 1.5:1 or about 1.6:1, a specific preferred minimum value being about 1.64:1. The higher the b:a ratio, the greater the protection of the crotch and the less the orientation around the crotch. The maximum value of the b:a ratio is believed dictated by economical considerations (too much punch-out and lower strengths per meter width) rather than functional considerations and may be up to about 2.5:1 or up to about 3:1 or greater.

Consideration of the b:a ratio is relevant to starting materials where there are protuberances in the crotch-forming zones as seen in plan view and primarily where there is no change in thickness in the crotch-forming zone. However, the b:a ratio can be expressed as a ratio of the cross-sectional areas in the planes corresponding to those containing b and a. The cross-sectional area ratios are applicable to starting materials where there is a change in thickness or both a protuberance in plan view and a change in thickness. The planes would be those immediately before the change in thickness and immediately after the change in thickness. In general terms, one can consider the rate of increase in SD cross-sectional area over a certain PD distance.

At least up to 90°, the greater the shoulder angle θ, the greater the protection of the crotch and the less orientation around the crotch. Any inflection or protuberance enables a satisfactory product to be manufactured at reduced SD punch-out, and it is believed that the closer the protuberance is to having right-angled shoulders, the lower the SD punch-out that may be used if a certain mode of failure is preserved. The angle θ is preferably more than about 50°, 60°, 65°, 70° or 75°; the angle θ is preferably less than about 135°, 125°, 115°, 110° or 105°; the preferred angle θ is about 90°.

The angle χ between the shoulder tangent 5 and the neck tangent 10 is preferably roughly 90° or an obtuse angle. The neck angle ψ is preferably about 0°. However, it is not excluded that the neck angle should have a negative value, ie with the hole 1 widening out again from a narrower "neck" as one approaches the PD end of the hole 1.

Considered in the SD, the crotch-forming zones can be as (i) to (iii) or (iv) to (vi) as set out above in relation to the crotch-forming zones as considered in the PD. The d:c ratio determines at least in part the amount the junction and crotch centre are thinned and oriented in the SD stretch. The d:c ratio is preferably greater than about 1.5:1 or greater than about 2:1; the ratio is preferably less than about 3:1 or less than about 4:1. By having the d:c ratio sufficiently large, any reduction of the thickness of the centre of the junction during the SD stretch can be avoided. In order to prevent the SD orientation penetrating too far towards the mid-point of the junction, the width c of the SD strand-forming zone 9 can be reduced or the bar thickness can be reduced, for instance by extruding material with PD grooves registering with the centre parts of the holes or for instance using the technique described in U.S. Pat. No. 4,590,029. The SD orientation can be taken beyond the line on which the dimension d is measured. It is preferred that during the SD stretch, the orientation does not extend so far around the crotch that the whole of the crotch is oriented.

The base line 12 of the protuberance 6 preferably makes an angle φ with the PD of mnore than about 30° or 35°; the angle φ is preferably less than about 60° or 55°. The projecting extent j can be about 3% to about 15%, preferably about 5% to about 10%, of the length of the diagonal i. If the base line 12 of the protuberance 6 is too short and if the projecting extent j is too great, there will be a tendency for the orientation to go behind the protuberance 6 as though the protuberance 6 were not there.

Preferably, the very LD ends of the holes 1 will be formed by continuous curves, though this is not necessarily so as the ends could be formed by straight SD lines. The sides of the crotch-forming zones 13 will be formed bycurves (which are not necessarily circular arcs) which can connect directly into one another or can be connected with one another by straight lines; the connections are smooth, ie no very small radius kinks or notches, at least where there is a connection that is concave to the hole 1. The radii should not be so small as to cause a notch and not so large as to impair the blocking function of the protuberance. The radii chosen can have a significant effect on the formation of the block.

Normally, it is preferred that each hole 1 be symmetrical about the PD axis and/or about the SD axis. The central parts of the sides of the PD strand-forming zones, ie the parts connecting said PD end portions, can be any suitable shape, eg of "diabolo" shape as disclosed in U.S. Pat. No. 4,743, 486, straight, or elliptical concave with respect to the hole 1. Grooving techniques such as the cold grooving described in U.S. Pat. No. 4,590,029 can be applied to the PD or SD strand-forming zones 11, 9.

The area of the PD strand-forming zone, as seen in SD section normal to the mesh structure between the respective PD tangent lines, is preferably less than about twice the area of the SD strand-forming zone as seen in section normal to the mesh structure and along the axis of the centre line of the SD strand-forming zone from the PD tangent line at one end of the zone to the PD tangent line at the other end of the zone. On a flat sheet, this ratio is equivalent to the SD punch-out.

Complex Starting Material Hole Configurations

The invention is applicable to more complex starting materials of square construction where some of the holes are different and are not on the same notional square or rectangle grid as the shaped holes of the inventions, eg as described in U.S. Pat. Nos. 4,536,429 or 4,574,100. However, in general, the invention is either applied to substantially every junction, or, with said more complex starting materials (where there will be junctions of different types in the biax products), the invention is applied to substantially every junction of a certain type.

Depending upon the configuration of the holes in the starting material, a plurality of junctions could be connected tog ether not by oriented strands but by unoriented or low-oriented material. In this manner, there can be a plurality of junctions connected in the PD and/or in the SD, the so-connected junctions interconnecting six or more oriented strands. The junction mid-point continues to be that point that corresponds to the mid-point of the notional junction zone, taking all holes into account unless they do not contribute to the formation of an oriented strand. Thus the invention is applicable to just one corner of a junction; each crotch which interconnects an oriented PD strand and an oriented SD strand can be of the form of the invention with the other crotches being of other forms. With such a mixed starting material, the dimensions a and b or c and d can be measured to the centre line of the respective PD or SD strand-forming zone.

In one form of starting material that provides such connected junctions, there are holes in accordance with the invention aligned in the PD; in the SD, holes in accordance with the invention are interspersed between other holes which are not in accordance with the invention, eg holes as disclosed in U.S. Pat. No. 4,743,486. In the SD, there can be one said other hole between hoies in accordance with the invention, or, if less SD extension is required, two, three or any suitable number of said other holes. The PD distance between said other holes may need to be greater than the PD distance between the holes in accordance with the invention. The holes are such that during the SD stretch, only the SD strand-forming zones between the holes in accordance with the invention stretch out. It is found that such a structure has better long-term creep performance, though its SD dimension will not be maximised, overall SD stretch ratios being reduced to say about 1.5:1 or less.

In another form of the invention, holes of the invention are interspersed in the PD between other holes which are not in accordance with the invention, the SD width of the latter other holes may need to be less than that of the holes. of the invention, ie in the PD, there may be wider holes (greater SD dimension) interspersed with narrower holes. The narrower holes between the holes of the invention can assist in producing the crotch block effect of the invention. On stretching in the PD, the narrow gaps between the PD ends of the wider and narrower holes prevent the crotch being stretched right out and assist in the formation of a block; on stretching in the SD, the narrow gaps act as narrow yield points and assist in preventing large forces being applied across the junction.

In another form of starting material, the invention is applied to one side of the hole but not to the other side of the hole, giving a hole which is asymmetrical about its PD axis.

There may be other ways of achieving the crotch block effect.

There is available a mesh structure in which the SD oriented strands are each wholly or partially divided into two generally superimposed strands which may be somewhat displaced relative to each other in the PD, looking at the structure in plan, formed from an extruded starting material in which a slot is formed in the PD through the middle of the SD strand-forming zone. The present invention could be applied to such a starting material. Structures produced in this manner are expected to have the advantages of the invention.

Starting Materials

The starting materials can be in general as set out from column 10, lines 20 to 24 and from column 10, line 32 to column 11, line 6 of U.S. Pat. No. 5,269,631, which disclosure is incorporated herein by reference. The preferred plastics materials are polyolefins. The experimental work on which the present invention is based was performed on medium molecular weight HDPE, which has a relatively low rate of work hardening. Other material, and also factors such as different stretching temperatures and rates and different degrees of restraint at right angles to the stretching direction, can significantly change the mesh structure produced. Thus, test pieces of the starting material should be stretched on a laboratory scale to determine whether they perform in accordance with the invention.

The holes 1 can be made in any suitable way; the preferred way is to punch, though moulding is possible and in theory a Hureau-type or Rical-type or Sire-type die head (as in FR 2 131 842 or U.S. Pat. No. 3,252,181) could be used if the hole shape and thickness profiles can be sufficiently well defined. The starting materials need not be strictly or even substantially flat and can be for instance as disclosed in U.S. Pat. No. 5,053,264 or the bumpy materials which may be formed by extrusion with the Hureau-type or Rical-type or Sire-type die head. Normally, a moulding process and a Hureau-type or Rical-type or Sire-type die head provide holes with tapered sides. The starting materials need not be substantially uniplanar though are preferably so. The starting materials may be grooved as described above or may be specifically profiled, eg as described in U.S. Pat. No. 5,267,816. The starting materials are preferably not substantially oriented, though melt flow orientation can be present.

Testing

As the behaviour of the starting material varies with many factors such as the resin used, the thickness, the stretching temperature, the hole shapes and the hole pitches, laboratory samples should be produced and tested before carrying out tests on a production line, to ascertain whether the desired orientation behaviour is achieved. The application of truth lines to a laboratory sample greatly assists in observing the orientation behaviour.

Production Plant

Though not essential, the PD stretch will normally precede the SD stretch. In production, the PD will often be the machine direction (MD), but it could be the transverse direction (TD). Although it is normally more economical to carry out sequential MD/TD stretching with the TD stretch following the MD stretch, it is not essential for the present invention that the TD stretch should follow the MD stretch. Thus the PD stretch can be carried out before or after the SD stretch. Furthermore, multi-stage stetching can be employed, particularly in the PD; in such a case, the PD orientation need not be taken right through the junction until the final PD stretch. In normal manufacturing practice, the mesh structure is formed as a long MD length which is rolled up. It is not necessary to cool between stretches, and all or any two or any three stretching operations can be carried out in-line without cooling.

The plant illustrated in FIG. 11 or 11a of U.S. Pat. No. 4,374,798 can be used in commercial production to carry out the stretching operations of the inventions in two stages; alternatively the stretching may be in three or more stages, eg as described in U.S. Pat. No. 5,269,631.

Uses

The principal use is for strengthening soil and making a geotechnical structure, as referred to above, when the biaxially-stretched structure would be referred to as a geogrid. The uses set out from column 17, lines 45 to 61 and from column 17, line 64 to column 18, line 59 of U.S. Pat. No. 5,269,631 are appropriate for the mesh structures of the present invention. The mesh structures of the present invention are particularly suitable for retaining walls or embankments, with the PD generally at right angles to the face of the wall or embankment as seen from above.

However, the mesh structures can be used for other purposes. For instance, the mesh structures can be used in asphalt road constructions, particularly to avoid reflective cracking, or can be used in concrete constructions in order to control shrinkage cracking.

PREFERRED EMBODIMENTS

The invention will be further described, by way of example with reference to the accompanying drawings, in which:

FIG. 1g shows the dimensions of the holes in the starting material of FIG. 1a;

Figure 1A:
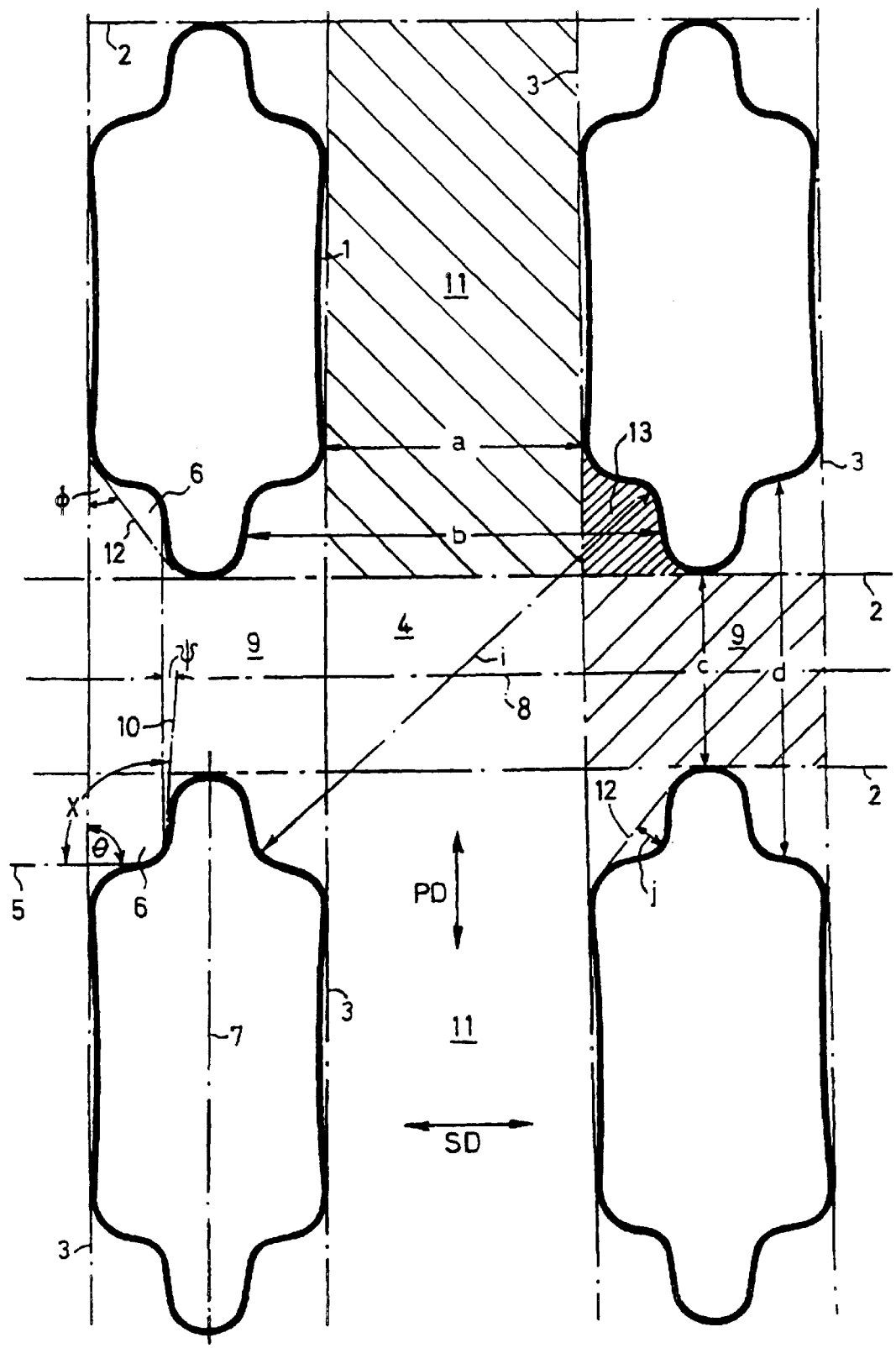
FIG. 1a is a diagram of four holes in a first starting material for making a geogrid.
Figure 1B:
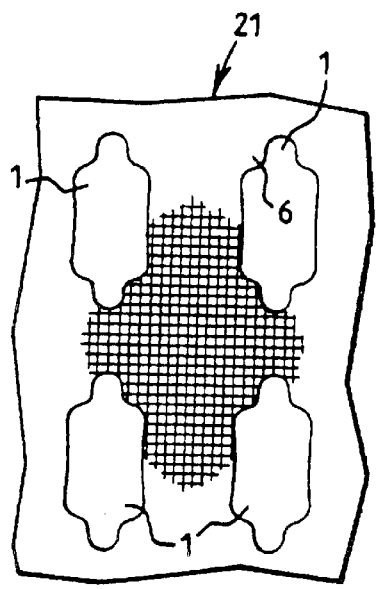
FIG. 1b is a plan view of the same starting material as in FIG. 1a, but showing truth lines.
Figure 1C:
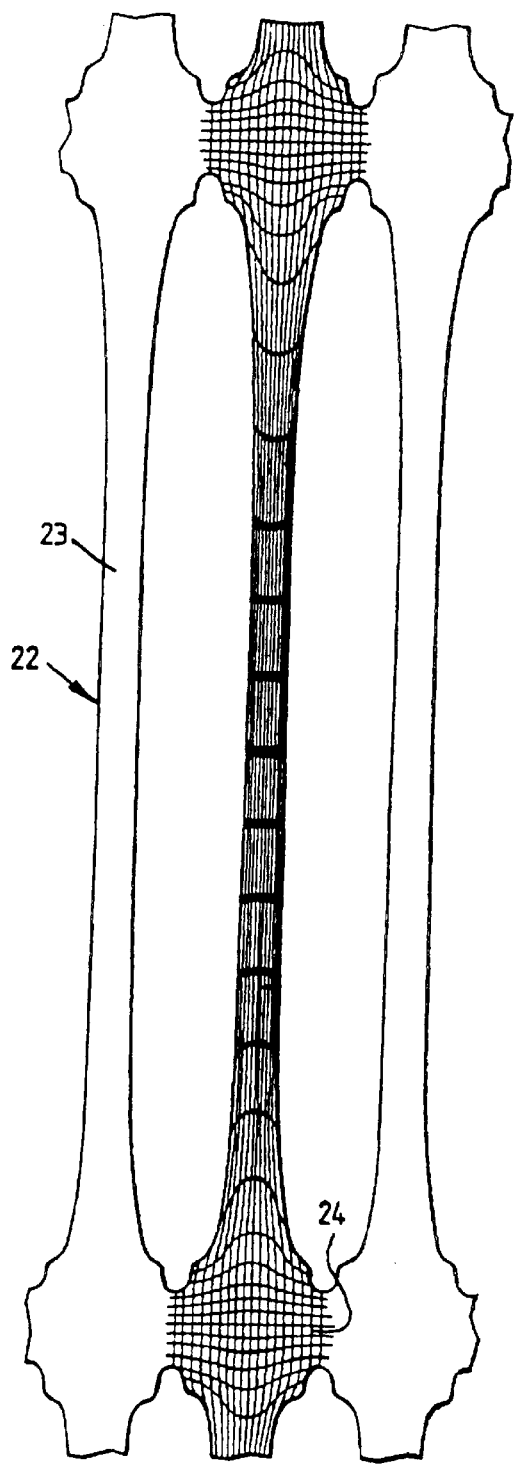
FIG. 1c is a plan view of the uniax intermediate material made from the starting material of FIG. 1b.
Figure 1D:
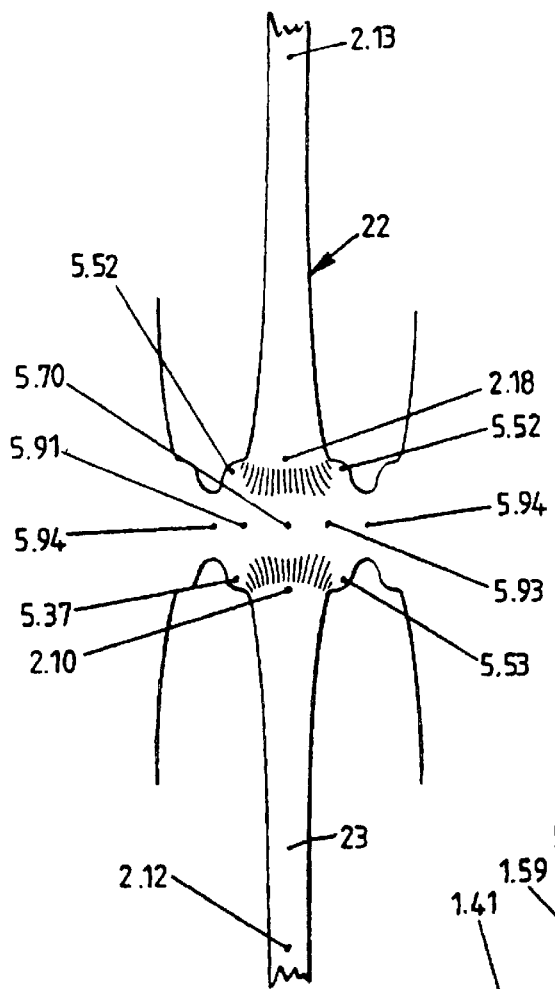
FIG. 1d is a plan view of the intermediate material of FIG. 1c, showing the thicknesses.
Figure 1F:
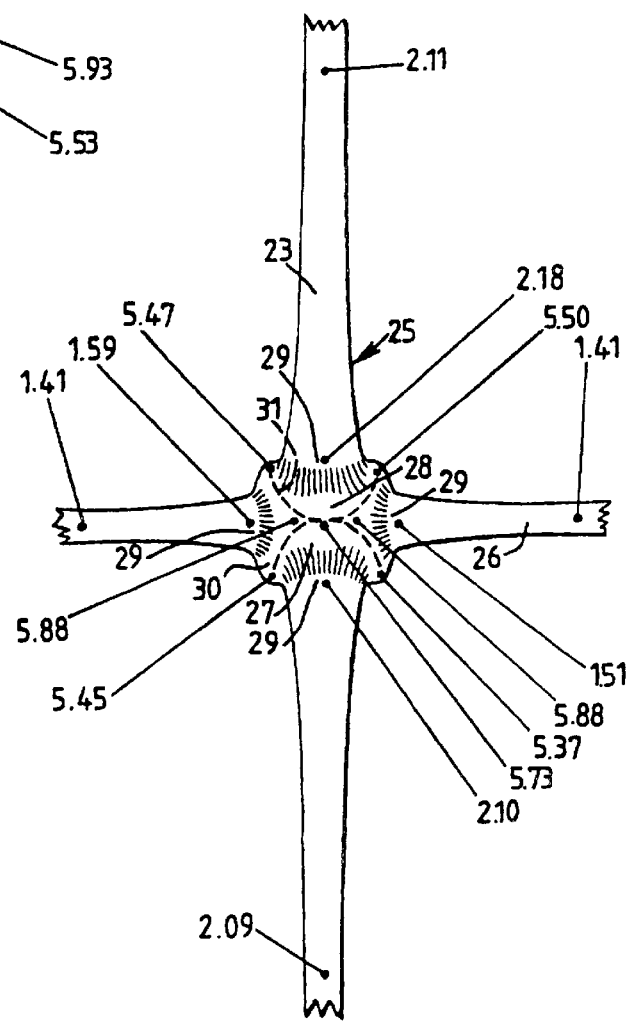
FIG. 1f is a plan view of one of the junctions shown in FIG. 1e, showing the thicknesses.
Figure 1E:
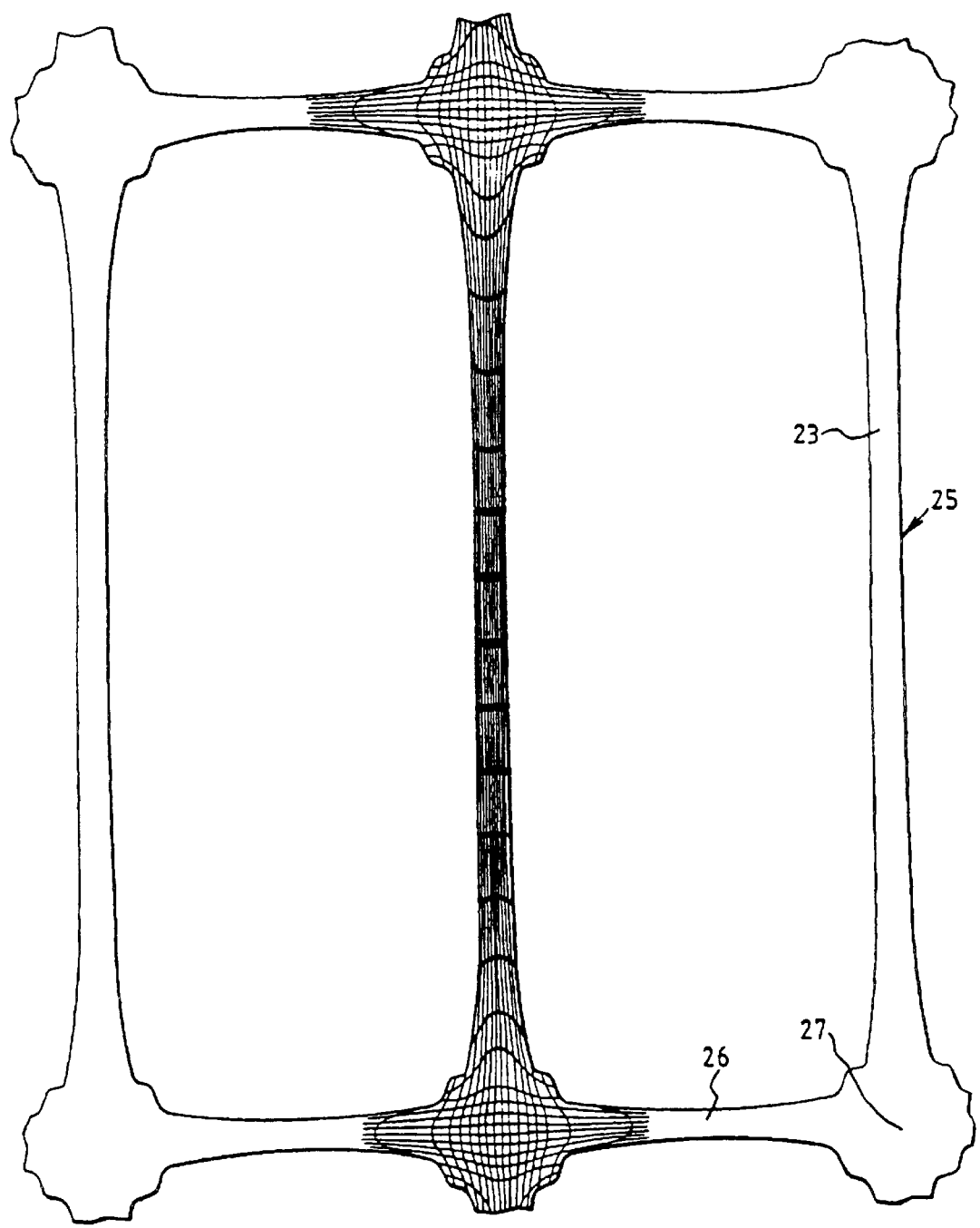
FIG. 1e is a plan view of the biax product made from the starting material of FIG. 1b.
Figure 1G:
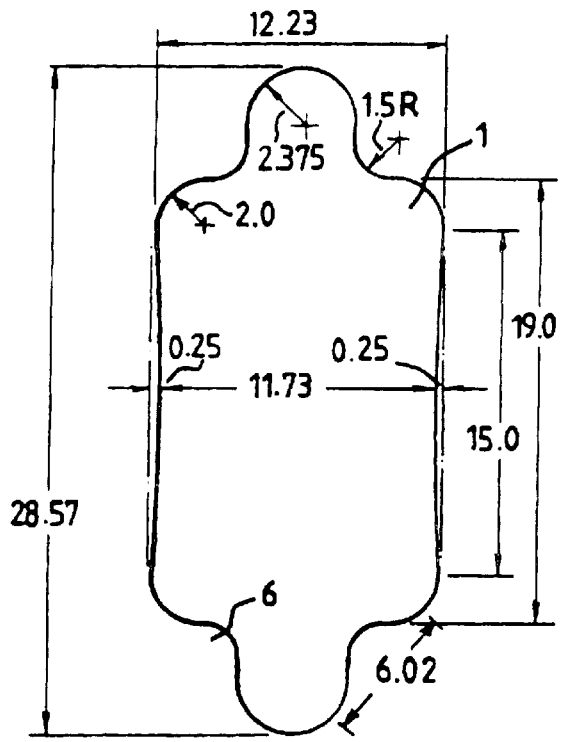
Figure 7C:
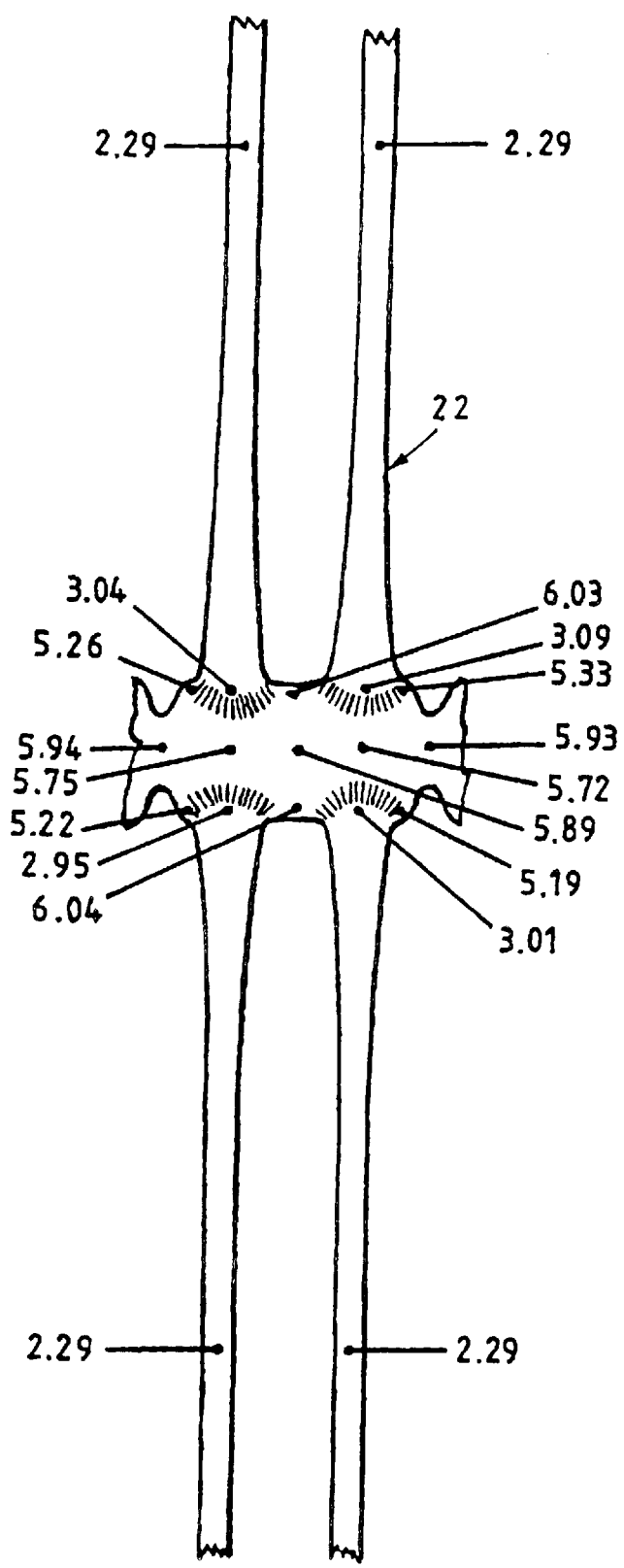
Figure 7D:
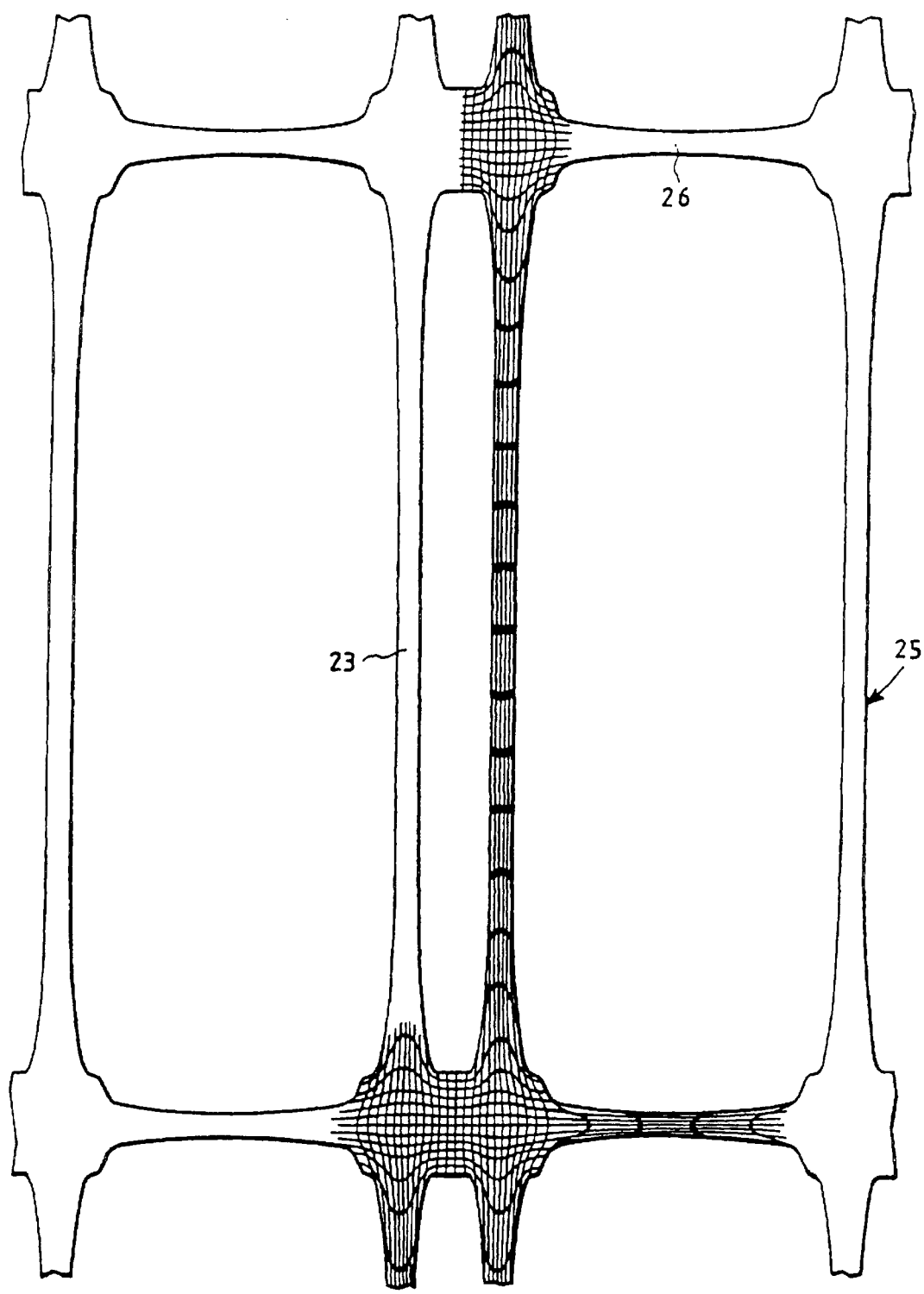
Figure 7E:
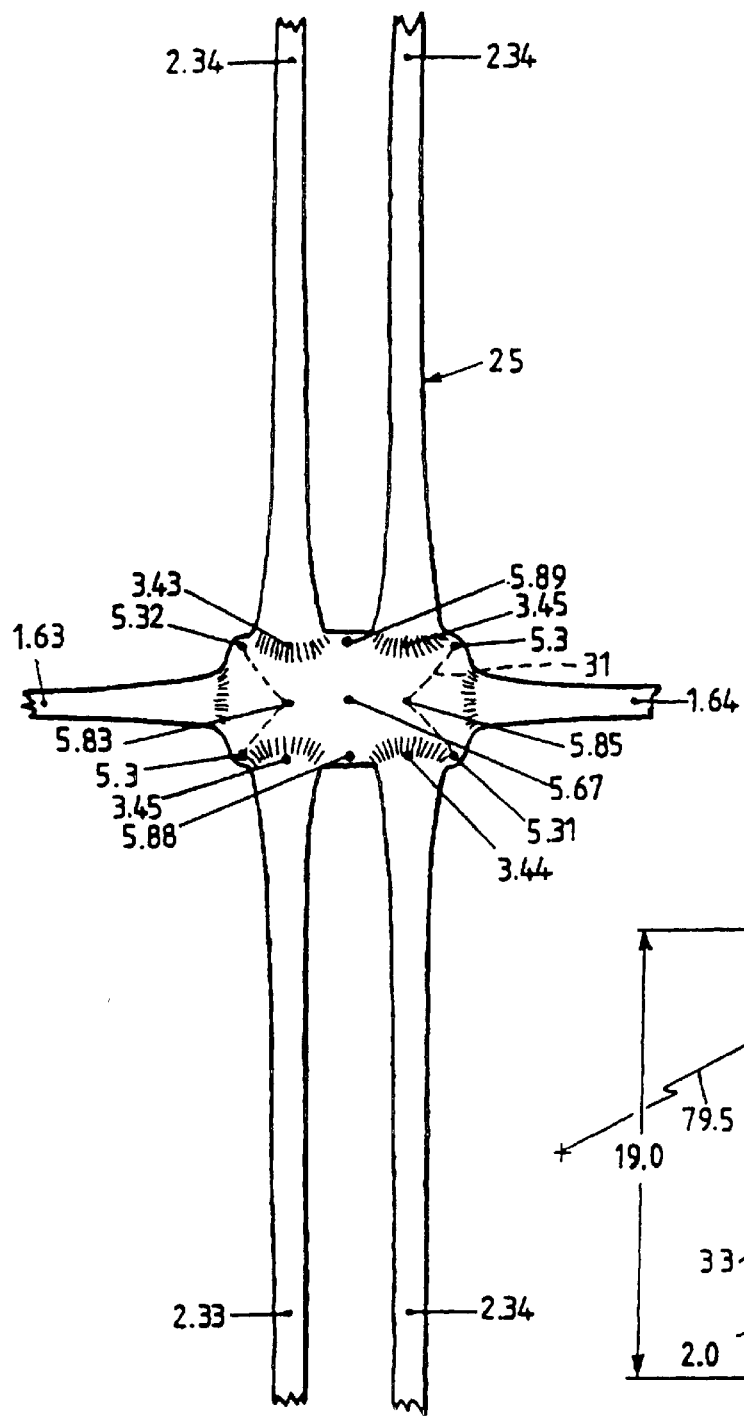
Figure 7F:
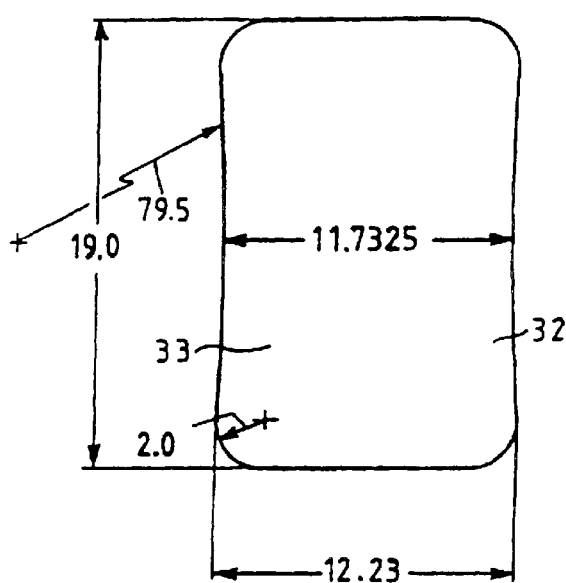
Figure 8C:
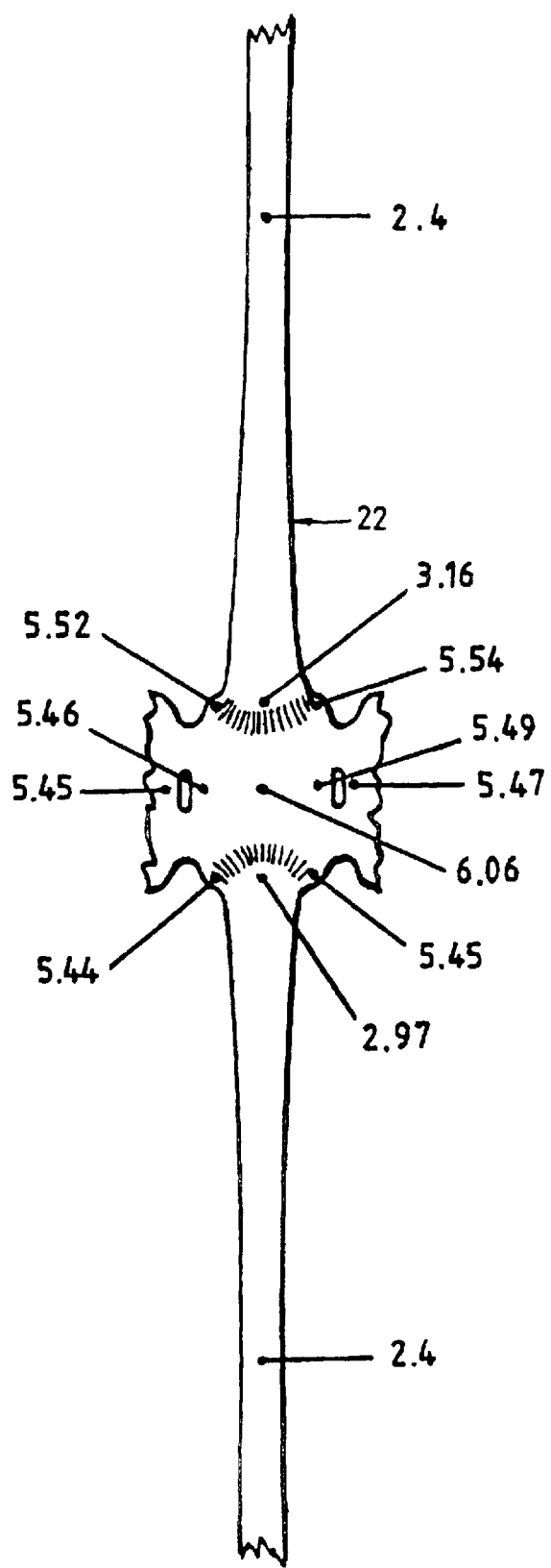
Figure 8D:
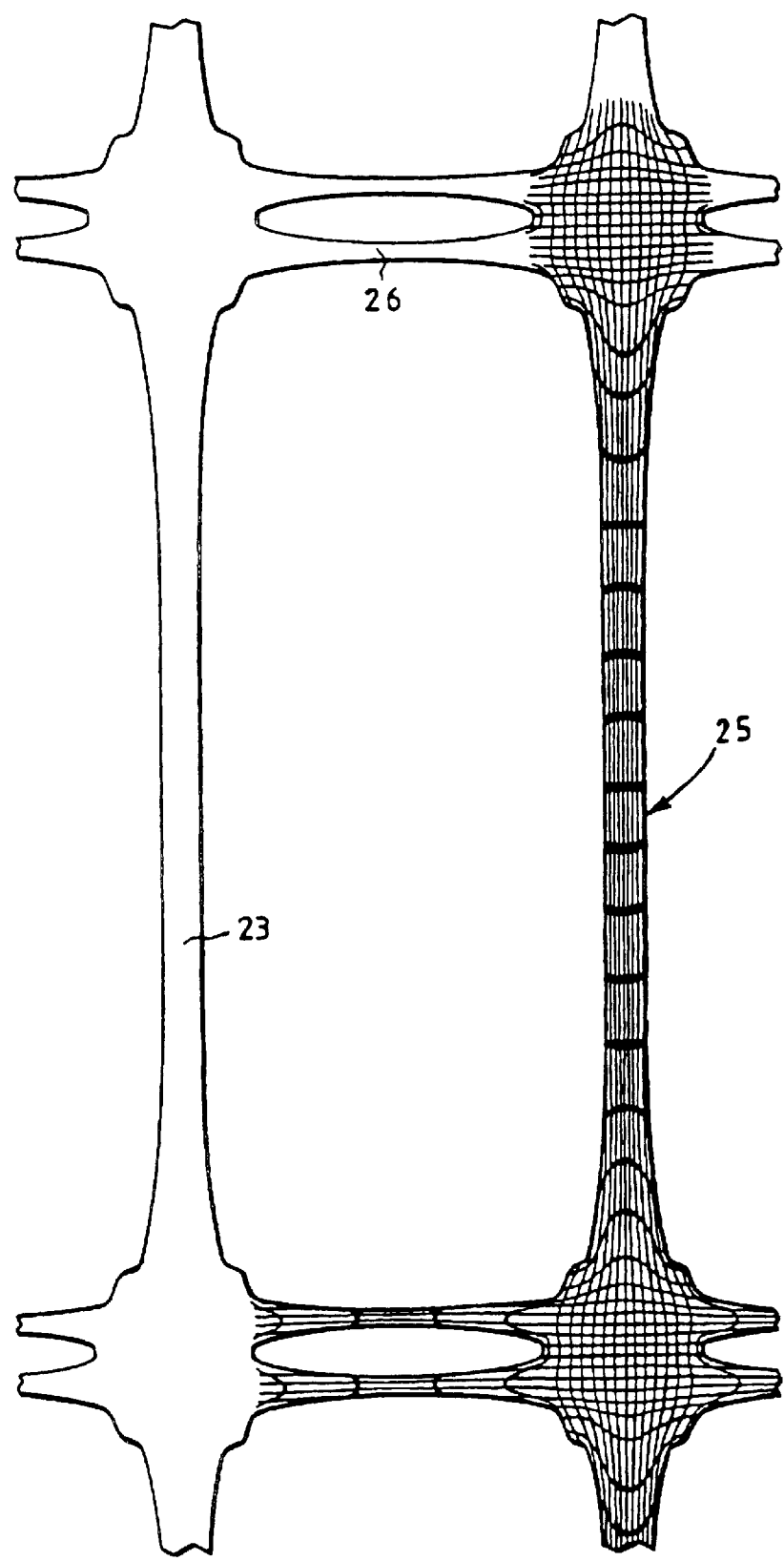
Figure 8E:
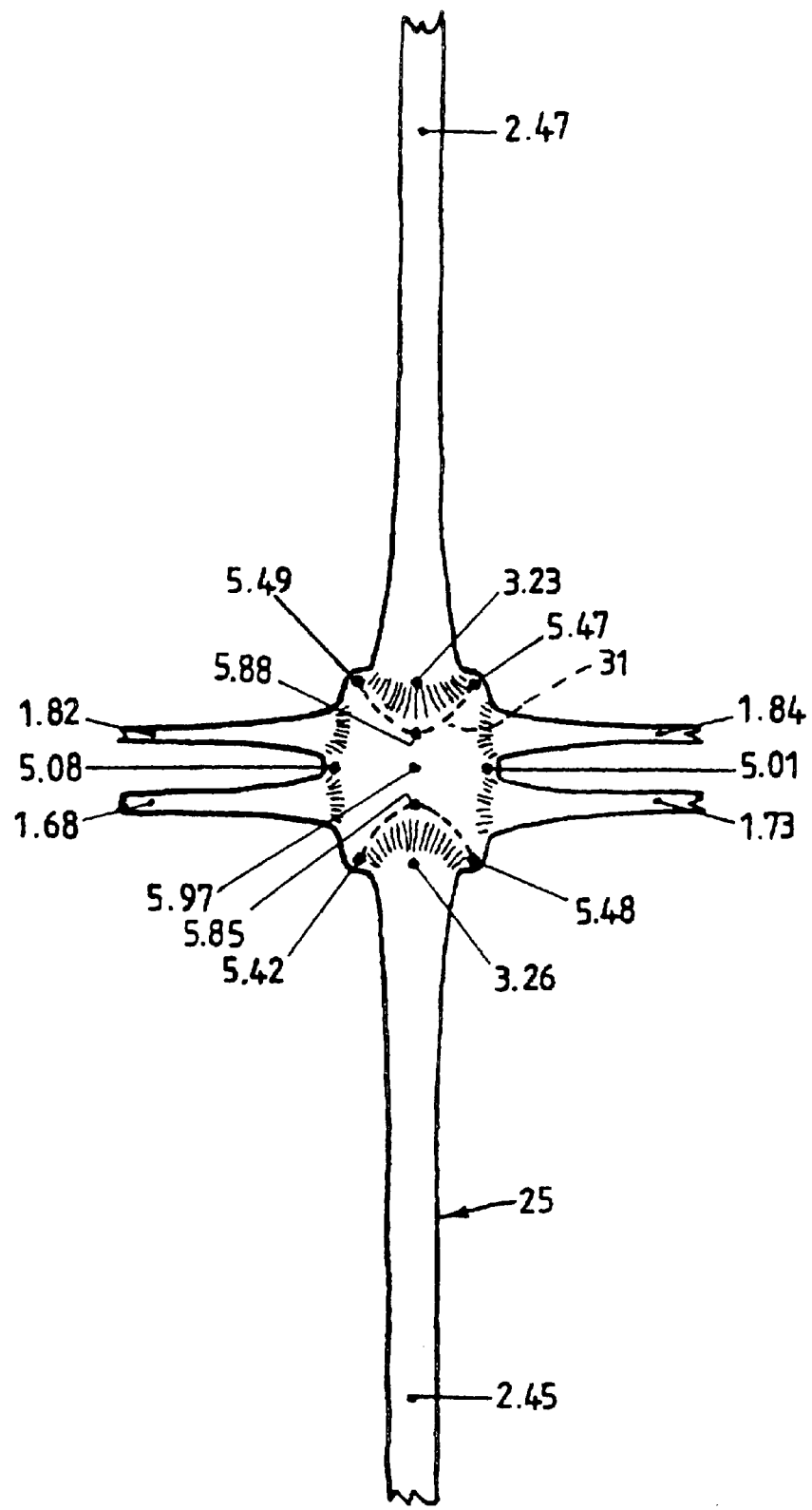
Figure 9A:
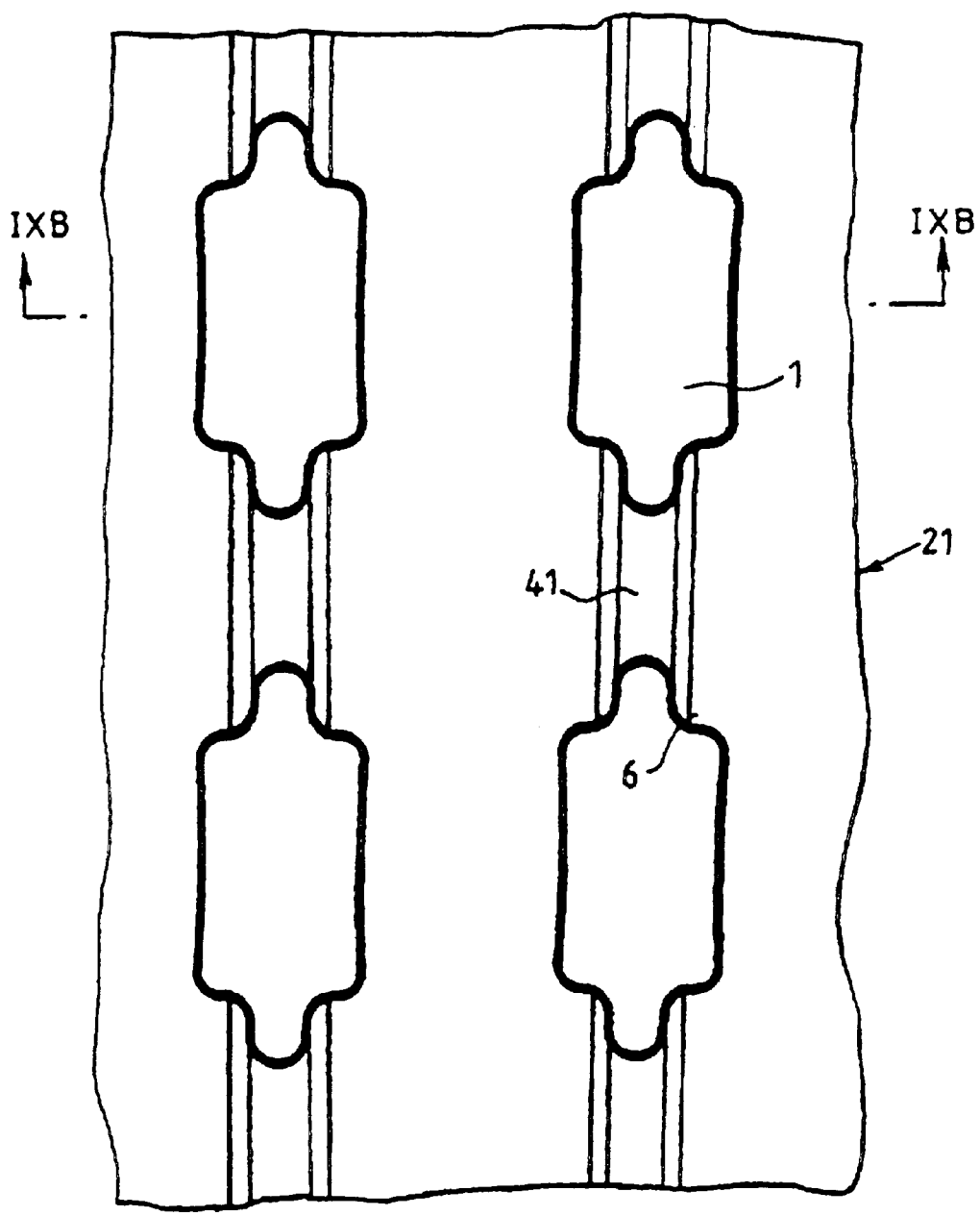
Figure 9B:
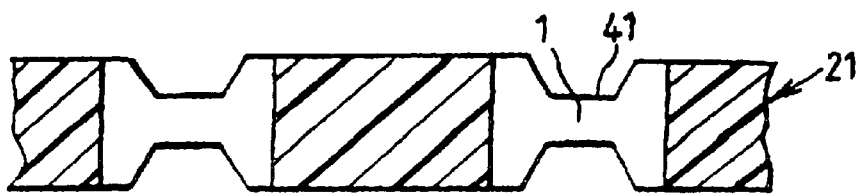
Figure 10A:
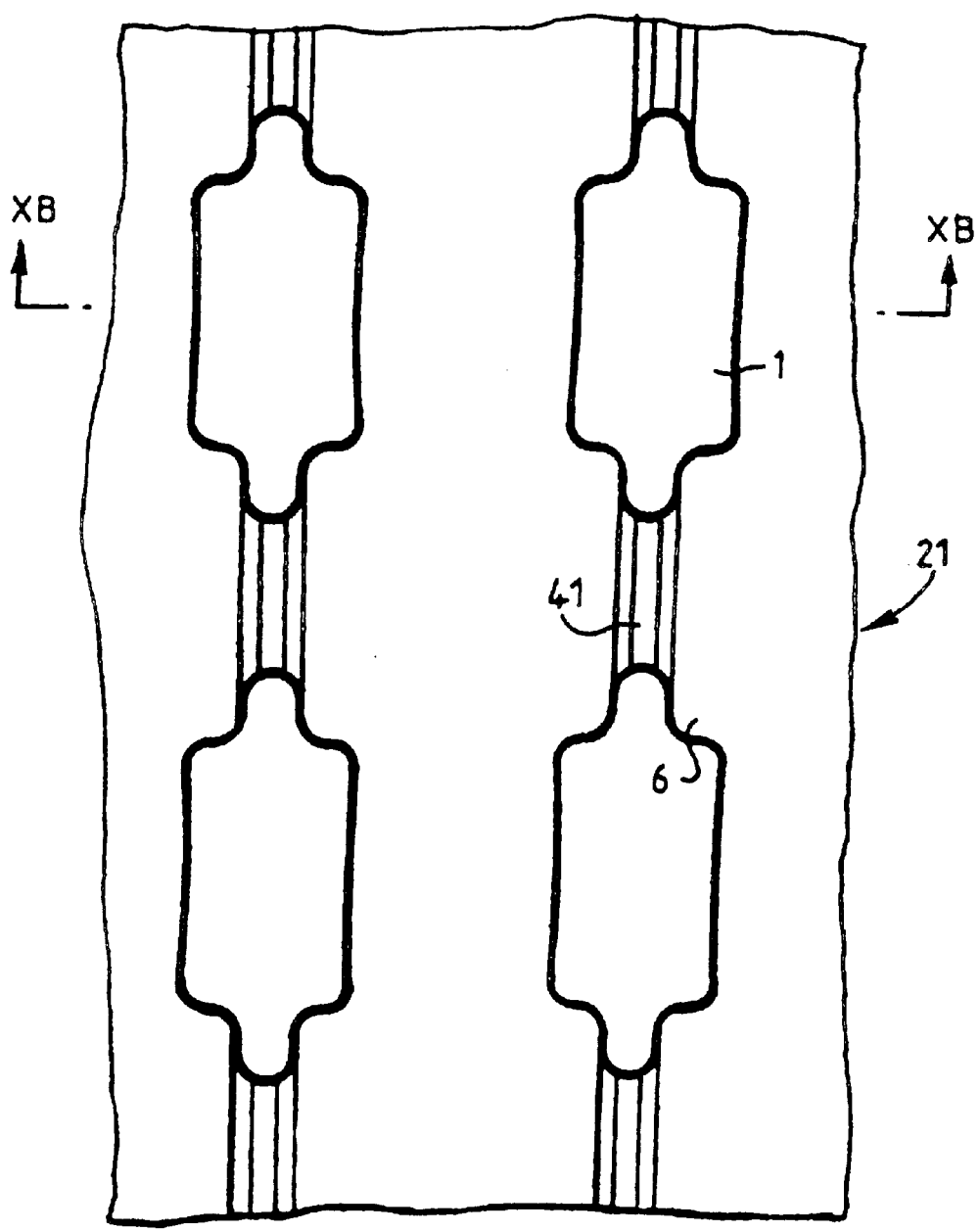
Figure 10B:
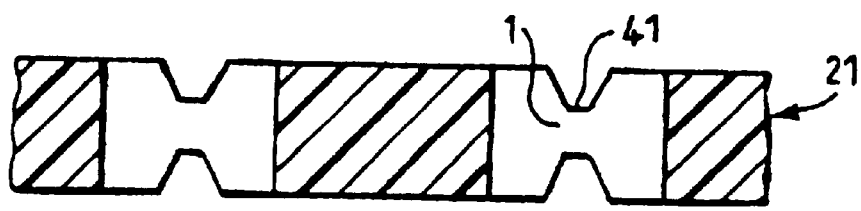

FIGS. 7a to 7e correspond to FIGS. 1b, 1c and 1d to 1f but using a seventh starting material, the holes being as in FIGS. 1g and 7f;

FIGS. 8a to 8e correspond to FIGS. 1a to 1e but using an eighth starting material, the larger holes being as in FIG. 1g and the smaller holes being 4.763 mm long with 1.588 mm radius semi-circles at each end;

FIG. 9a is a plan view of a first grooved starting material;

FIG. 9b is a section along the line IXB—IXB in FIG. 9a;

FIGS. 10a and 10b correspond to FIGS. 9a and 9b, and show a second grooved starting material; and FIGS. 11 to 15 are vertical sections through different geotechnical constructions incorporating the mesh structure of the invention.

The truth lines shown in the Figures can be screen-printed on the starting material, and indicate the progress of orientation, at least on the surface of the structure. They would not normally be provided on commercial materials.

The contour hatching in the Figures indicates a steep slope (increase in thickness), the hatching lines extending up the slope.

When more than one like junction of a stretched material is shown, all junctions are shown as identical although in production there could be small differences between junctions. In Figures which show successive stages, the junctions are not necessarily the same junction and the truth lines may be in somewhat different positions as it was necessary to use different test pieces.

In the Figures all dimensions are given in millimeters; where thicknesses are given, they are the thicknesses at the points indicated. A dimension with a single arrow indicates a circular arc. All arcs are circular arcs.

FIG. 1a

FIG. 1a shows various items defined above. FIG. 1a also shows crotch-forming zones 13 adjacent the corners of the notional junction zones 4, each lying between a respective hole 1, the adjacent PD tangent line 3 and the adjacent SD tangent line 2, one such zone 13 being shown cross-hatched in. If the holes 1 terminate in a rectilinear portion extending in the SD, the crotch-forming zones 13 will not define the very PD ends of the holes 1. In FIG. 1a, each PD strand-forming zone 11 can be considered as a zone between respective holes 1 and at its ends between respective crotch-forming zones 13, which extends from the SD tangent line 2 tangent to the first PD ends of the respective holes 1 to the SD tangent line 2 tangent to the other, second PD ends of the holes 1, one such zone 11 being shown cross-hatched. In FIG. 1a, each SD strand-forming zone 9 can be considered as the zone between respective holes 1 and between respective crotch-forming zones 13, which extends from the PD tangent line 3 tangent to the first SD ends of the respective holes 1 to the PD tangent line 3 tangent to the other, second SD ends of the holes 1, one such zone 9 being shown cross-hatched.

FIGS. 1e to 1f

The starting material 21 in FIG. 1b has been punched from strictly flat sheet. The hole 1 shape and dimensions are as shown in FIGS. 1a and 1g. The hole 1 is of waisted shape, in accordance with U.S. Pat. No. 4,743,486. The thickness can be 6 mm, and details can be as in Example 1 of the Table below. In the manner indicated with reference to FIG. 1a, the crotch-forming zones 13 have protuberances 6 with features (i) to (vi) referred to above. The yield points of the PD strand-forming zones 11 are at their narrowest parts (where the dimension a is shown in FIG. 1a).

FIGS. 1e and 1d show the uniax intermediate material 22, after the application of PD stretch. The PD strand-forming zones 11 have been stretched out into highly oriented PD strands 23 interconnected by transverse bars 24. As can be seen from slight splaying of the SD truth lines, a small amount of PD orientation has been taken right through the notional junction zones 4 and there is continuous uniaxial orientation extending from end to end of the structure.

From the thickness chart of FIG. 1d, it can be seen that the PD orientation in the PD strands 23 has extended round the crotches, but the size of the protuberances 6 is such that they have acted as a block and the orientation ratio decreases significantly as the orientation approaches the central part of the crotch edge, although the decrease may differ slightly from crotch to crotch. For each crotch, the orientation ceases just beyond the centre of the crotch edge.

FIGS. 1e and 1f show the biax product or geogrid 25 after the application of SD stretch. The SD stretch is such that the SD orientation ceases just before the crotch edge centres, thereby providing continuous orientation around the crotches from end to end in the direction of the crotches, but with low orientation in the crotch edge centres, the crotch edge centre thickness reductions noted in the uniax intermediate material 22 remaining substantially the same. The maximum thickness of the thickest part of the crotch edge does not coincide with the centre of the protruberance 6, and is more than about 80% of the thickness of the mid-point of the biax junction 27. The SD orientation is not taken across the centre of the notional junction zone 4, ie there is no further reduction in thickness of the centre of the notional junction zone 4, and the junction mid-point remains uniaxially oriented; the SD orientation ends at about 1.5 mm from the junction mid-point. FIG. 1f is G somewhat anomalous because some of the thicknesses are greater than in FIG. 1d, due to using different samples. The central portions of the SD strand-forming zones 9 have been stretched out into highly oriented SD strands 26. The junction 27 comprises a generally rectangular central zone 28 which has a slight dip running through its middle in the PD. The central zone 28 is however thicker than zones 29 on all four sides of the central zone 28; the zones 29 on the SD sides and/or PD sides may not be in the not ional junction zone. There are narrow projections 30 at the corners of the central zone 28, extending outwards, continuing through the crotches, and running into the crotch edges. The central parts of the crotch edges are convex relative to the junction. FIG. 1*f* indicates with dashed lines 31 the notional lines (ridge lines) of maximum thickness from the mid-point of the junction 27 to the crotch edge.

The PD strands 23 are closer together than the SD strands 26, although they need not be so, and have a greater cross-sectional area than the SD strands 26, although they need not have, but one of these features should be present so that the biax product 25 has significantly greater strength in the PD than in the SD.

FIGS. 2 to 6

Figure 4:
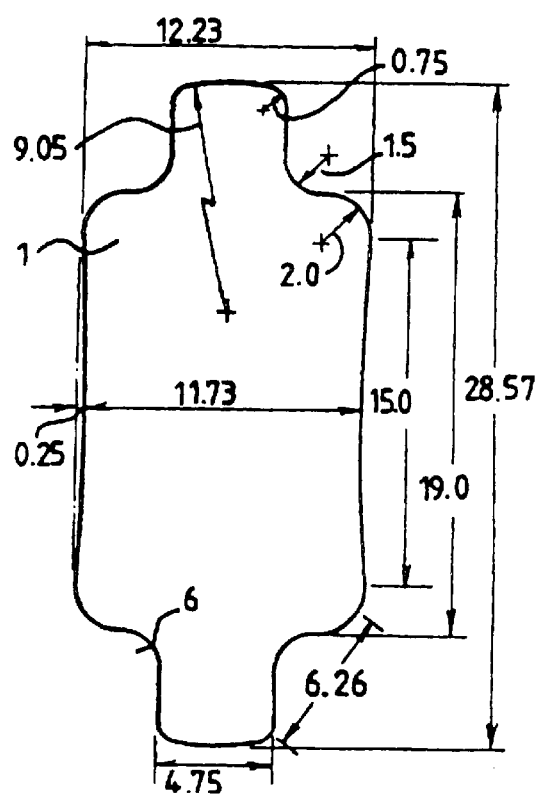
Figure 5:
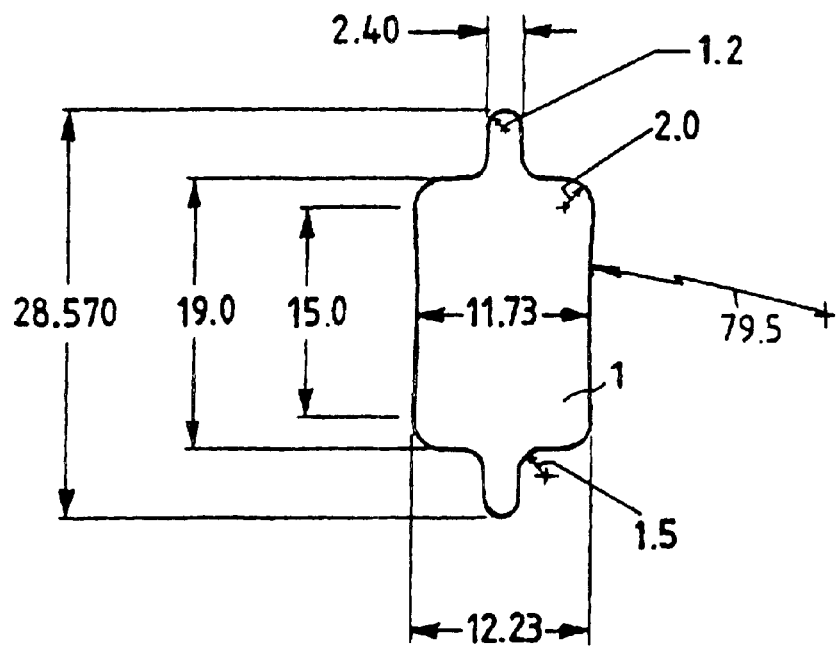
Figure 6:
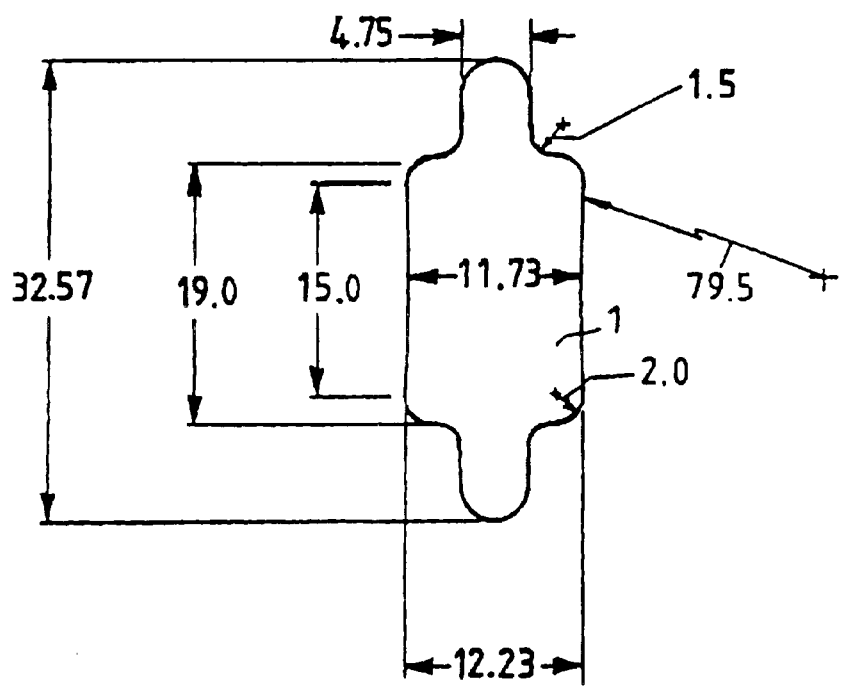

These Figures show the shape and dimensions of the holes 1 for the second to sixth starting materials. The holes 1 shown in FIGS. 2, 4, 5 and 6 are of waisted shape, in accordance with U.S. Pat. No. 4,743,486. The hole shape shown in FIG. 4 is the same as that of FIG. 1*g*, except that the end portions have a zone with parallel sides and the very end radius is relatively large.

FIGS. 7a to 7f

These Figures will not be described in detail. In the starting material main holes 1 in accordance with the invention are interspersed in the SD between other, subsidiary holes 32 which are not in accordance with the invention and are shorter in the PD than in the main holes 1. In the PD stretch, all the PD strand-forming zones stretch out. In the SD stretch, the wide SD strand-forming zones between the holes 32 do not stretch out and remain unoriented or only slightly oriented. In the biax product, pairs of junctions (notional junction zones) are connected in the SD by a zone of low-oriented material as shown in FIG. 7*e*. However, for the left and right hand crotches of the junction pairs, the orientation behaviour is generally as in FIGS. 1*e* and 1*f*. The top and bottom middle crotches of the junction pair are not oriented. The mid-points of the notional junction zones are indicated by the thicknesses 5.83 and 5.85 in FIG. 7*e*. The ridge lines 31 are taken from these mid-points, and are shown running into the left and right hand crotches of the junction pair. In the biax product 25, the PD strands 23 are in groups of two.

FIGS. 8a to 8e

These Figures will not be described in detail. In the starting material, main holes 1 in accordance with the invention are interspersed in the PD between other, subsidiary holes 33 which are not in accordance with the invention and are narrower than the holes 1. In the PD stretch, the PD strand-forming zones between the holes 1 stretch out but the wider zones between the holes 33 do not stretch out significantly; some minor contraction occurs in the SD. In the SD stretch, all the SD strand-forming zones stretch out. In the biax product, pairs of junctions (notional junction zones) are connected in the PD by a zone of low-oriented material whose mid-point is indicated by the thickness 5.97 in FIG. 8*e* and is biaxially oriented. However, for the top and bottom crotches of the junction pair, the orientation behaviour is generally as in FIGS. 1*e* and 1*f*, although there is some biaxial orientation in the centres of the notional junction zones. The crotches in the middle of the sides of the junction pair are unoriented or only slightly oriented. Ridge lines 31 are shown running from the notional junction zone midpoints into the top and bottom crotches of the junction pair.

FIGS. 9a and 9b

FIGS. 9*a* and 9*b* show a first starting material 21 which has deep PD grooves 41 with tapered sides passing through the centres of the holes 1. It is believed that different dimensional parameters, including the b:a and d:c ratios will apply for such starting materials than the parameters described herein for flat starting materials. In FIG. 9*a*, as one progresses from the PD strand-forming zone around the crotch edge, there is initially no decrease in thickness and then a rapid decrease in thickness at the site of the protuberance 6. The grooves 41 provide good yield points for the SD stretch and the rapid increase in thickness as one progresses along the SD strand-forming zone prevents excessive penetration of the SD orientation into the junction. In the product, the thickest part of the crotch edge is at a position corresponding to a position on the starting material just before the rapid decrease in thickness.

FIGS. 10a and 10b

FIGS. 10*a* and 10*b* correspond closely to FIGS. 9*a* and 9*b*, except that the grooves 29 are narrower.

EXAMPLES

A number of laboratory samples were prepared using flat HDPE sheet of about 0.95 g/cc density and nominal thickness 6.0 mm. The sheet of Example 2 was made from a Soltex resin produced by Solvay; the sheet for the other Examples was made from a resin produced by Borealis. The latter resin is slightly poorer when the biax products are compared but was available for large scale manufacture. Both resins were medium strain-hardening material. Sheets were punched and screen printed with a 1.6 mm square grid pattern. The sheets were stretched at a temperature of 105° C. in two directions at right angles at a relative cross-head speed of 250 mm/min, being stretched sequentially first in the PD and then in the SD. The samples were effectively unrestrained in the SD during the PD stretch; the samples were all restrained in the PD during the SD stretch to simulate manufacture in a plant with PD stretching first in the MD, the restraint being close to 100%. The stretch ratios are overall (after any contraction that may occur after releasing the stretching force). Test specimens were cut from the samples, each comprising a single strand with three junctions except for Example 6 where the specimens comprised pairs of PD strands. For tensile testing, each specimen was gripped by jaws at the two extreme junctions, the middle junction being centrally disposed. Tensile loads were applied axially (PD or SD) to the specimen at a cross-head displacement rate of 50 mm/min. All testing was at 20° C.±1° C.

Examples and test results are given in the following Table. "n/a" indicates that the relevant measurement test or calculation was not carried out. In Example 7, the SD punch-out is given for the main (larger) holes and for the sub (smaller) holes. In the headings, "uniax" means the intermediate structure after the PD stretch, "biax" means the final product. The crotch edge thicknesses are the average thicknesses for a single junction measured. Though there are connected junctions in the biax products of Examples 6 and 7, the biax junction mid-point thickness is expressed as the average thickness of the mid-points of the two junctions.

FIG. 12 shows a retained wall 52 formed of discrete blocks or incremental panels, which wall 51 can be vertical

TABLE

Figure 2:
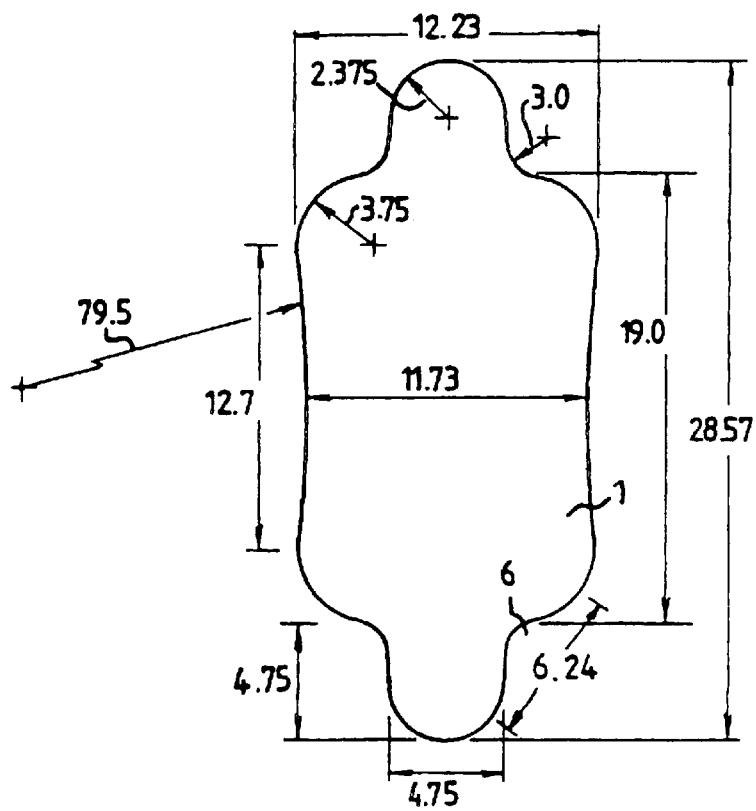
FIGS. 2 to 6 show the dimensions of holes of second to sixth starting materials.
Figure 3:
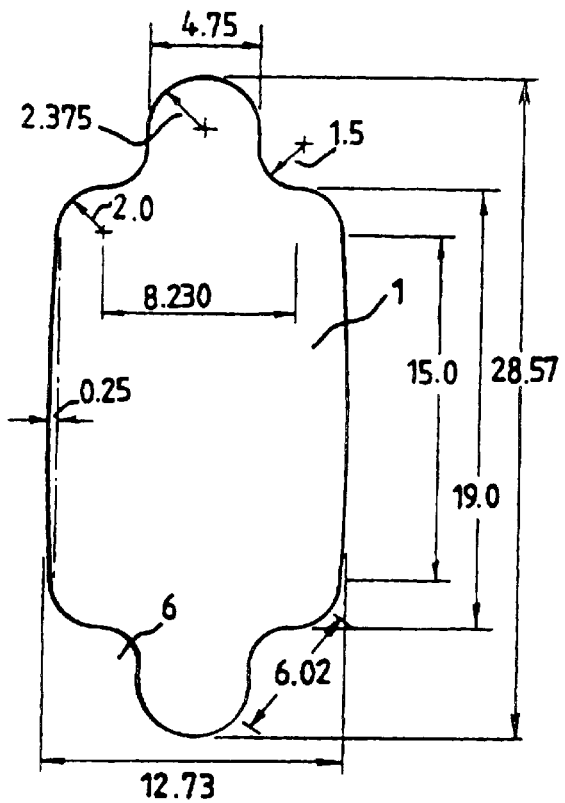

| Example | Hole shape | PD pitch | SD pitch | SD punch-out, % | Projecting extent (j), mm | b:a | d:c | θ | ψ | χ | φ |
|---|---|---|---|---|---|---|---|---|---|---|---|
| 1 | FIG. 1g | 38 | 24 | 51 | 1.5 | 1.6:1 | 2.0:1 | 90 | 0 | 90 | 39 |
| 2 | FIG. 1g | 38 | 27 | 45 | 1.5 | 1.5:1 | 2.0:1 | 90 | 0 | 90 | 39 |
| 3 | FIG. 2 | 38 | 24 | 51 | 1.0 | 1.6:1 | 2.0:1 | 67 | 0 | 113 | 33 |
| 4 | FIG. 3 | 38 | 24 | 53 | 1.5 | 1.5:1 | 2.0:1 | 90 | 0 | 90 | 39 |
| 5 | FIG. 4 | 38 | 24 | 51 | 1.8 | 1.6:1 | 2.0:1 | 90 | 0 | 90 | 34 |
| 6 | FIG. 7a | 38 | 24 | 50 | 1.5 | 1.6:1 | 2.0:1 | 90 | 0 | 90 | 39 |
| 7 | FIG. 8a | 46 | 27 | 45 main 13 sub | 1.5 | 1.5:1 | 1.8:1 | 90 | 0 | 90 | 39 |

| Example | a:t | c:t | Starting material thickness (t), mm | Thickness of crotch edge after punching, mm | PD stretch ratio | SD stretch ratio | Distance of SD orientation from junction mid-point, mm | Junction diagonal ratio | Uniax junction mid-point thickness, mm | Uniax % reduction in junction mid-point thickness |
|---|---|---|---|---|---|---|---|---|---|---|
| 1 | 2.0:1 | 1.6:1 | 6.1 | 5.9 | 5.0:1 | 2.7:1 | 6 | 0.9:1 | 5.9 | 4.1 |
| 2 | 2.5:1 | 1.6:1 | 6.0 | 5.5 | 5.0:1 | 2.7:1 | 7 | 0.9:1 | 5.7 | 4.2 |
| 3 | 2.0:1 | 1.6:1 | 6.1 | 6.0 | 5.0:1 | 2.7:1 | 5 | 0.9:1 | 5.8 | 4.4 |
| 4 | 2.0:1 | 1.6:1 | 6.1 | 6.0 | 5.0:1 | 2.7:1 | 6 | 0.9:1 | 5.8 | 5.2 |
| 5 | 2.0:1 | 1.6:1 | 6.1 | 6.0 | 5.0:1 | 2.7:1 | 5 | 0.9:1 | 5.9 | 3.6 |
| 6 | 2.0:1 | 1.6:1 | 6.1 | <6.1 | 5.0:1 | 1.8:1 | n/a | 1.0:1 | 5.9 | 3.6 |
| 7 | 2.5:1 | 2.1:1 | 6.1 | <6.1 | 3.9:1 | 2.6:1 | n/a | 1.0:1 | n/a | 0.8 |

| Example | Biax junction mid-point thickness, mm | Biax % reduction in junction mid-point thickness | Biax thickness of thickest crotch edge part | Biax % reduction in thickness of thickest crotch edge part | Biax ridge-line minimum thickness, mm | Biax ridge-line thickness ratio, % | Ratio biax thickest crotch edge part: junction mid-point, % |
|---|---|---|---|---|---|---|---|
| 1 | 5.8 | 4.4 | 5.3 | 9.8 | 5.2 | 90 | 91 |
| 2 | 5.7 | 3.7 | 5.4 | 3.1 | 5.4 | 94 | 94 |
| 3 | 5.8 | 4.3 | 5.0 | 17 | 5.0 | 87 | 85 |
| 4 | 5.9 | 3.9 | 5.5 | 8.4 | 5.3 | 90 | 93 |
| 5 | 5.9 | 4.1 | 5.4 | 9.7 | 5.3 | 89 | 92 |
| 6 | 5.8 | 4.9 | 5.3 | 11 | 5.3 | 89 | 89 |
| 7 | 5.9 | 3.3 | 5.5 | 8.8 | 5.5 | 92 | 92 |

| Example | Uniax PD peak load, kN/rib | Uniax rupture mode*** | Biax PD peak stress, MPa | Biax PD peak load, kN/rib | Biax PD strength, kN/m | Biax weight, g/m$^2$ | Biax PD economy rating, kN/m/kg/m$^2$ | Biax PD rupture mode*** | Biax SD peak load, kN/rib | Biax SD strength, kN/m | Biax PD/SD rib strength | Biax PD/SD strength |
|---|---|---|---|---|---|---|---|---|---|---|---|---|
| 1 | 2.58 | 1 | 266 | 2.61 | 40.8 | 298 | 137 | 1 | 2.00 | 10.5 | 1.3 | 3.9 |
| 2 | 2.92 | 1 | 242 | 2.93 | 40.0 | 309 | 129 | 1 | n/a | n/a | n/a | n/a |
| 3 | 2.71 | 1 | 268 | 2.55 | 39.2 | 293 | 134 | 3 | 1.99 | 10.4 | 1.3 | 3.8 |
| 4 | 2.67 | 1 | 306 | 2.60 | 40.6 | 296 | 137 | 3 | 1.98 | 10.3 | 1.3 | 3.9 |
| 5 | 2.59 | 1 | 257 | 2.53 | 39.0 | 290 | 134 | 2 | 1.84 | 9.6 | 1.4 | 4.1 |
| 6 | 2.611 | 1 | 243 | 2.60 | 61.0 | 467 | 131 | 1 & 4 | 1.90 | 10.0 | 1.4 | 6.1 |
| 7 | 3.092 | 1 | 214 | 3.04 | 44.0 | 438 | 101 | 1 | 2.86 | 15.9 | 1.1 | 2.8 |

***1 All strand breaks
2 Mostly strand breaks
3 Mostly ductile junction failures
4 All ductile junction failures FIGS. 11 to 15

FIGS. 11 to 15 are schematic illustrations of known geotechnical structures, in which geogrids 25 in accordance with the invention are used in place of earlier geogrids. In each case, the geogrid 25 is shown with its PD extending across the plane of the paper and its SD extending out of the plane of the paper. For short lengths of geogrid 25, the manufacturing technique could be such that the geogrid has a much greater dimension in the SD than in the PD so that a single width of geogrid extends across a broad part of the face of the geoconstruction.

BRIEFLY

FIG. 11 shows a retained wall 51 formed of full-height panels which can be vertical or inclined by up to 45° to the vertical. The geogrids 25 are in parallel layers and fixed to the wall 51.

or inclined by up to 45° to the vertical. The geogrids 25 are fixed to the blocks or panels or are securDed between or to them in any suitable manner, eg by friction or using mortar or pins or special fixings.

FIG. 13 shows the face of a retained embankment 52 with the geogrids 25 in parallel layers and the end of each geogrid 25 taken up at the face and brought back into the soil, the brought-back part 26 being in contact with the geogrid 25 of the next layer up.

FIG. 14 shows a simpler retained embankment 52 construction, with the geogrids 25 terminating at the face.

FIG. 15 shows an embankment 52 whose base is stabilised by a geogrid 25. There may be multiple, vertically-spaced layers of geogrid 25 in any suitable arrangement, above the geogrid 25 shown.

The disclosures of the patent specifications referred to above are included in this disclosure by reference.

The present invention has been described above purely by way of example, and modifications can be made within the spirit of the invention.

What is claimed is:

1. A method of producing a biaxially-stretched plastics material geogrid for use in a geotechnical construction, having a greater strength in a primary direction (PD) than in a secondary direction (SD) substantially at right angles to the PD, comprising:

providing a substantially uniplanar plastics starting material which has a thickness of at least about 2 mm and has a pattern of through-holes on a substantially square or rectangular grid whose axes are substantially parallel to the PD and to the SD respectively, the sides of at least some PD end portions of said holes being defined by crotch-forming zones having protuberances;

applying PD stretch to form oriented PD strands and to apply some orientation to the junction-forming zones so that orientation extends into and through the junction- forming zones; and applying SD stretch with an overall stretch ratio of at least about 1.5:1 as measured from the mid-point of one junction-forming zone to the mid-point of the adjacent junction-forming zone in the SD to form oriented SD strands;

in the geogrid so produced, the mid-point of the junction zone being substantially thicker than the mid-point of any oriented strand entering the junction zone, and the edge of the crotch interconnecting adjacent sides of adjacent oriented PD and oriented SD strands being oriented in the direction running around the crotch with the orientation ratio decreasing significantly as one passes around the crotch edge either from the oriented PD strand or from the oriented SD strand, the crotch edge either a) having an unoriented part, or b) the thickness of the least oriented part of the crotch edge being reduced, or the length of the least oriented part of the crotch edge being increased, by no more than about 20% by the action of stretching, and the action of stretching not reducing the thickness of any point along generally diagonally-extending lines of maximum thickness on the biaxially-stretched mesh structure from the mid-point of the junction zone to said crotch edges to such an extent that the ratio of finished thickness to starting thickness at that point is less than about 80% of the ratio of finished thickness to starting thickness of the junction zone mid-point.

2. The method of claim 1, wherein the protuberances are in the plan view shape of the hole.

3. The method of claim 2, wherein, as seen in plan view as one progresses towards the PD end of the hole, each said crotch-forming zone has:

i) a first part which widens out;
ii) a second part which does not widen out as rapidly as the first part; and
iii) a third part which widens out more rapidly than the second part and terminates the crotch-forming zone.

4. The method of claim 1, wherein the ratio of the SD dimension between adjacent side-by-side holes between respective points where the respective tangent to a side of the protuberance makes the smallest angle with the PD or between the points where the tangent is coincident with the crotch edge and furthest from the PD end of the hole if the respective part of the protuberance side is straight, with respect to the minimum SD distance between adjacent side-by-side holes is greater than about 1.5:1.

5. The method of claim 1, wherein the ratio of the PD dimension between adjacent side-by-side holes between respective points where the respective tangent to a side of the protuberance makes the greatest angle with the PD or between the points where the tangent is coincident with the crotch edge and furthest from the SD side of the hole if the respective part of the protuberance is straight, with respect to the minimum PD distance between adjacent side-by-side holes is greater than about 1.5:1.

6. The method of claim 1, wherein the PD stretch is applied with an overall stretch ratio of at least about 3:1 as measured from the mid-point of one junction-forming zone to the mid-point of the adjacent junction-forming zone in the PD.

7. The method of claim 1, wherein the SD punch-out is less than about 60%.

8. The method of claim 1, wherein said plastics material is a polyolefin.

9. The method of claim 1, wherein holes having at least one crotch-forming zone as defined in claim 1 are interspersed in the SD between other holes which do not have a crotch-forming zone as defined in claim 1.

10. The method of claim 1, wherein holes having at least one crotch-forming zone as defined in claim 1 are interspersed in the PD between other holes which do not have a crotch-forming zone as defined in claim 1.

11. A biaxially-stretched integral plastics material mesh structure produced by the method of claim 1.

12. A biaxially-stretched substantially uniplanar integral plastics material geogrid for use in a geotechnical construction having a greater strength in a primary direction (PD) than in a secondary direction (SD) substantially at right angles to the PD and having a first face and a second face, made from a starting material which has a thickness of at least about 2 mm, and comprising oriented PD strands and oriented SD strands, interconnected by junctions whose mid-point thickness is substantially greater than the mid-point of any oriented strand entering the junction, adjacent sides of adjacent oriented PD and oriented SD strands being interconnected by crotches whose edges for at least part of their length are oriented with orientation running in the direction around the crotch, said PD and SD strands and said crotches defining mesh openings substantially free of fibrils, the orientation of the PD strands extending into and through the junctions, and the junctions comprising a central zone which is thicker than thinner zones in the junction adjacent the ends of oriented PD and oriented SD strands, the junction central zone having on each face thereof a narrow generally diagonally-extending projection at the corner extending outwards between said thinner zones, continuing through the crotch between the oriented PD and oriented SD strands and running into the crotch edge, with no point on a line of maximum thickness on the geogrid from the junction mid-point to the crotch edge having a thickness of less than about 80% of the thickness of the junction mid-point.

13. The geogrid of claim 12, wherein said junction interconnects two oriented PD strands entering the junction from opposite sides and two oriented SD strands approaching or entering the junction from two other opposite sides, and the junction central zone is substantially square or rectangular with a said narrow projection at each corner.

14. The geogrid of claim 12, wherein said junction is connected by non-oriented or low-oriented material to an adjacent junction in the SD.

15. The geogrid of claim 12, wherein said junction is connected by non-oriented or low-oriented material to an adjacent junction in the PD.

16. A geotechnical construction, comprising a mass of particulate material strengthened by embedding therein the geogrid of claim 11, said geogrid reinforcing said mass whereby said mass creates tensile forces in said PD strands and said geogrid substantially maintains the configuration of said mass.

17. A method of producing a biaxially-stretched plastics material geogrid for use in a geotechnical construction, having a greater strength in a primary direction (PD) than in a secondary direction (SD) substantially at right angles to the PD, comprising:

providing a substantially uniplanar plastics starting material which has a thickness of at least about 2 mm and has a pattern of through-holes on a substantially square or rectangular grid whose axes are substantially parallel to the PD and to the SD respectively, the sides of at least some PD end portions of said holes being defined by crotch-forming zones in which, as seen in plan view as one progresses towards the PD end of the hole, each said crotch-forming zone has:

(i) a first part having a side which is progressively more inclined to the PD and is defined at least in part by a curve which is concave with respect to the hole;

(ii) a sccond part having a side which is progressively less inclined to the PD and is defined at least in part by a curve which is convex with respect to the hole; and (iii) a third part having a side which is progressively more inclined to the PD and is defined at least in part by a curve which is concave with respect to the hole;

applying PD stretch to form oriented PD strands and to apply some orientation to the junction-formning zones so that orientation extends into and through the junction-forming zones; and applying SD stretch with an overall stretch ratio of at least about 1.5:1 as measured from the mid-point of one junction-forming zone to the mid-point of the adjacent junction-forming zone in the SD, to form oriented SD strands;

in the geogrid so produced, the mid-point of the junction zone being substantially thicker than the mid-point of any oriented strand entering the junction zone, and the edge of the length of the crotch interconnecting adjacent sides of adjacent oriented PD and oriented SD strands being oriented in the direction running around the crotch with the orientation ratio decreasing significantly as one passes around the crotch edge either from the oriented PD strand or from the oriented SD strand, the crotch edge either a) having an unoriented part, or b) the thickness of the least oriented part of the crotch edge being reduced, or the length of the least oriented part of the crotch edge being increased, by no more than about 20% by the action of stretching, and the action of stretching not reducing the thickness of any point along generally diagonally-extending lines of maximum thickness on the biaxially-stretched mesh structure from the mid-point of the junction zone to the crotch edges to such an extent that the ratio of finished thickness to starting thickness at that point is less than about 80% of the ratio of finished thickness to starting thickness of the junction zone mid-point.

18. A method of producing a biaxially-stretched plastics material geogrid for use in a geotechnical construction, having a greater strength in a primary direction (PD) than in a secondary direction (SD) substantially at right angles to the PD, comprising:

providing a substantially uniplanar plastics starting material which has a thickness of at least about 2 mm and has a pattern of through-holes on a substantially square or rectangular grid whose axes are substantially parallel to the PD and to the SD respectively, the sides of at least some PD end portions of said holes being defined by crotch-forming zones in which, as seen in plan view as one progresses towards the PD end of the hole, each said crotch-forming zone has:

(i) a first part having a side which is progressively more inclined to the PD axis and is defined at least in part by a curve which is concave with respect to the hole;

(ii) a second part having a side which is progressively less inclined to the PD and is defined at least in part by a curve which is convex with respect to the hole; and (iii) a third part having a side which is progressively more inclined to the PD and is defined at least in part by a curve which is concave with respect to the hole;

applying PD stretch to form oriented PD strands and to apply some orientation to the junction-formning zones so that orientation extends into and through the junction-forming zones; and applying SD stretch with an overall stretch ratio of at least about 1.5:1 as measured from the nmid-point of on junction-forming zone to the mid-point of the adjacent junction-forming zone in the SD, to form orientated SD strands;

in the geogrid so produced, the mid-point of the junction zone being substantially thicker than the mid-point of any oriented strand entering the junction zone, and the edge of the length of the crotch interconnecting adjacent sides of adjacent oriented PD and oriented SD strands being oriented in the direction running around the crotch with the orientation ratio decreasing significantly as one passes around the crotch edge either from the oriented PD strand or from the oriented SD strand, the crotch edge either a) having an unoriented part, or b) the thickness of the least oriented part of the crotch edge being reduced, or the length of the least oriented part of the crotch edge increased, by not more than about 20% by the action of the stretching.

19. The method of claim 17, wherein the SD punch-out is less than about 60%.

20. A method of producing a biaxially-stretched plastics material geogrid for use in a geotechnical construction having a greater strength in a primary direction (PD) than in a secondary direction (SD) substantially at right angles to the PD, comprising:

providing a substantially uniplanar plastics starting material which has a thickness of at least about 2 mm and has a pattern of through-holes on a substantially square or rectangular grid whose axes are substantially parallel to the PD and to the SD respectively, and wherein the SD punch-out is less than about 60%, the sides of at least some PD end portions of said holes being defined by crotch-forming zones in which, as seen in plan view as one progresses towards the PD end of the hole, each said crotch-forming zone has:

(i) a first part having a side which is progressively more inclined to the PD axis and is defined at least in part by a curve which is concave with respect to the hole;

(ii) a second part having a side which is progressively less inclined to the PD and is defined at least in part by a curve which is convex with respect to the hole; and (iii) a third part having a side which is progressively more inclined to the PD and is defined at least in part by a curve which is concave with respect to the hole;

applying PD stretch to form oriented PD strands and to apply some orientation to the junction-forming zones so that orientation extends into and through the junction-forming zones; and applying SD stretch with an overall stretch ratio of at least about 1.5:1 as measured from the mid-point of on junction-forming zone to the mid-point of the adjacent junction-forming zone in the SD, to form orientated SD strands;

in the geogrid so produced, the mid-point of the junction zone being substantially thicker than the mid-point of any oriented strand entering the junction zone, and the edge of the length of the crotch interconnecting adjacent sides of adjacent oriented PD and oriented SD strands being oriented in the direction running around the crotch with the orientation ratio decreasing significantly as one passes around the crotch edge either from the oriented PD strand or from the oriented SD strand, the crotch edge either a) having an unoriented part, or b) the thickness of the least oriented part of the crotch edge being reduced, or the length of the least oriented part of the crotch edge increased, by not more than about 20% by the action of the stretching.

21. A substantially uniplanar biaxially-stretched integral plastics material mesh structure geogrid for use in a geotechnical construction, having a greater strength in a primary direction (PD) than in a secondary direction (SD) substantially at right angles to the PD and having a first face and a second face, made from a starting material which has a thickness of at least about 2 mm, and comprising oriented PD strands and oriented SD strands, interconnected by junctions whose mid-point thickness is substantially greater than the mid-point of any oriented strand entering the junction, adjacent sides of adjacent oriented PD and oriented SD strands being interconnected by crotches whose edges for at least part of their length are oriented with orientation running in the direction running around the crotch, said PD and SD strands and said crotches defining mesh openings substantially free of fibrils, the orientation of the PD strands extending into and through the junctions, and the junctions comprising a central zone which is thicker than thinner zones in the junction adjacent the ends of oriented PD and oriented SD strands, the junction central zone having on each face thereof a narrow generally diagonally-extending projection at the corner extending outwards between said thinner zones, continuing through the crotch between the oriented PD and oriented SD strands and running into the crotch edge, with no point on a line of maximum thickness on the geogrid from the junction mid-point to the crotch edge having a thickness of less than about 80% of the thickness of the junction mid-point.

22. A geotechnical construction, comprising a mass of particulate material and a reinforcing means therefor, said reinforcing means comprising at least one generally horizontally-extending layer of a geogrid produced by the method of claim 1, said geogrid having upper and lower faces, said PD strands and said SD strands defining therebetween mesh openings, said geogrid being embedded in said mass of particulate material with portions of said mass of particulate material below said geogrid, portions of said mass of particulate material above said geogrid, and portions of said mass of particulate material within said mesh openings, so that portions of said particulate material are in direct contact with said upper and lower faces of said geogrid and with portions of said geogrid which define said mesh openings, whereby said mass creates tensile forces in said PD strands and said geogrid has good slip resistance properties with respect to said particulate material.

23. A method of constructing a geotechnical construction, comprising:

providing a mass of particulate material and a reinforcing means therefor, said reinforcing means comprising at least one generally horizontally-extending layer of a geogrid produced by the method of claim 1, said geogrid having upper and lower faces and said PD and SD strands defining therebetween mesh openings; and embedding said geogrid in said mass of particulate material with portions of said mass of particulate material below said geogrid, portions of said mass of particulate material above said geogrid, and portions of said mass of particulate material within said mesh openings, so the portions of said particulate material are in direct contact with said upper and lower faces of said geogrid and with portions of said geogrid defining said mesh openings;

whereby said mass creates tensile forces in said PD strands and said geogrid has good slip resistance with respective to said particulate material.

24. A method of producing a biaxially-stretched plastics material geogrid for use in a geotechnical construction, having a greater strength in a primary direction (PD) than in a secondary direction (SD) substantially at right angles to the PD, comprising:

providing a substantially uniplanar plastics starting material which has a thickness of at least about 2 mm and has a pattern of through-holes on a substantially square or rectangular grid, the SD punch-out being less than about 60%, the axes of said grid being substantially parallel to the PD and to the SD respectively, the sides of at least some PD end portions of said holes being defined by crotch-forming zones in which, as seen in plan view as one progresses towards the PD end of the hole, each said crotch-formning zone has:
  (i) a first part having a side which is progressively more inclined to the PD and is defined at least in part by a curve which is concave with respect to the hole;
  (ii) a second part having a side which is progressively less inclined to the PD and is defined at least in part by a curve which is convex with respect to the hole; and
  (iii) a third part having a side which is progressively more inclined to the PD and is defined at least in part by a curve which is concave with respect to the hole;

applying PD stretch to form oriented PD strands and to apply some orientation to the junction-forming zones so that orientation extends into and through the junction-forming zones; and applying SD stretch with an overall stretch ratio of at least about 1.5:1 as measured from the mid-point of one junction-forming zone to the mid-point of the adjacent junction-forming zone in the SD, to form oriented SD strands;

the geogrid so produced having a first face and a second face, and in said geogrid, the junction zone forming a junction which interconnects two oriented PD strands entering the junction from opposite sides and two oriented SD strands approaching or entering the junction from two other opposite sides, the junction comprising a central zone which is thicker than thinner zones in the junction adjacent the ends of the oriented PD and oriented SD strands and the central zone being substantially square or rectangular and having a narrow projection at each corner thereof extending outwards between said thinner zones, continuing through the crotch between the respected oriented PD and oriented SD strands and running into the crotch edge, the mid-point of the junction zone being substantially thicker than the mid-point of any oriented strand entering the junction zone, and the edge of the length of the crotch interconnecting adjacent sides of adjacent oriented PD and oriented SD strands being oriented in the direction running around the crotch with the orientation ratio decreasing significantly as one passes around the crotch edge either from the oriented PD strand or from the oriented SD strand, the crotch edge either a) having an unoriented part, or b) the thickness of the least oriented part of the crotch edge being reduced, or the length of the least oriented part of the crotch edge being increased, by no more than about 20% by the action of stretching, and the action of stretching not reducing the thickness of any point along generally diagonally-extending lines of maximum thickness on the biaxially-stretched mesh structure from the mid-point of the junction zone to the crotch edges to such an extent that the ratio of finished thickness to starting thickness at that point is less than about 80% of the ratio of finished thickness to starting thickness of the junction zone mid-point.

25. The method of claim 1, wherein said starting material defines a plane and said holes are defined by sides which extend at right angles to said plane.

* * * * *